(12) United States Patent
Mitani

(10) Patent No.: US 11,934,779 B2
(45) Date of Patent: Mar. 19, 2024

(54) INFORMATION PROCESSING DEVICE, INFORMATION PROCESSING METHOD, AND PROGRAM

(71) Applicant: SONY GROUP CORPORATION, Tokyo (JP)

(72) Inventor: Ryosuke Mitani, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 289 days.

(21) Appl. No.: 17/612,522

(22) PCT Filed: Apr. 1, 2020

(86) PCT No.: PCT/JP2020/015086
§ 371 (c)(1),
(2) Date: Nov. 18, 2021

(87) PCT Pub. No.: WO2020/241039
PCT Pub. Date: Dec. 3, 2020

(65) Prior Publication Data
US 2022/0215168 A1 Jul. 7, 2022

(30) Foreign Application Priority Data

May 30, 2019 (JP) ................................. 2019-101703

(51) Int. Cl.
*G06F 40/268* (2020.01)
*G06F 40/216* (2020.01)
*G06F 40/242* (2020.01)

(52) U.S. Cl.
CPC .......... *G06F 40/268* (2020.01); *G06F 40/216* (2020.01); *G06F 40/242* (2020.01)

(58) Field of Classification Search
CPC .... G06F 40/216; G06F 40/242; G06F 40/268; G06F 17/30985; G10L 15/06
(Continued)

(56) References Cited

U.S. PATENT DOCUMENTS

2015/0242537 A1* 8/2015 Takeuchi ............ G06F 16/2465
707/776

FOREIGN PATENT DOCUMENTS

JP 2001-051996 A 2/2001
JP 2008-305291 A 12/2008
(Continued)

OTHER PUBLICATIONS

International Search Report and Written Opinion of PCT Application No. PCT/JP2020/015086, dated Jun. 23, 2020, 08 pages of ISRWO.
(Continued)

*Primary Examiner* — Md S Elahee
(74) *Attorney, Agent, or Firm* — CHIP LAW GROUP

(57) ABSTRACT

The occurrence cost of unknown words that are not registered in a morphological analysis dictionary is calculated by applying an occurrence cost regression model, which is a learning model. An information processing device includes a notation feature amount extraction unit that extracts a notation feature amount of a character string, a part-of-speech feature amount extraction unit that extracts a part-of-speech feature amount of the character string, and an occurrence cost estimation unit that receives the notation feature amount and the part-of-speech feature amount and calculates an occurrence cost of the character string by applying an occurrence cost regression model. The occurrence cost regression model is a learning model that estimates the occurrence cost from the notation feature amount and the part-of-speech feature amount of a character string, generated by a learning process using registration data of an existing morphological analysis dictionary as teacher data.

17 Claims, 13 Drawing Sheets

(58) Field of Classification Search
USPC .............................................................. 704/9
See application file for complete search history.

(56) References Cited

FOREIGN PATENT DOCUMENTS

| JP | 2010039864 A | * | 2/2010 | |
|---|---|---|---|---|
| JP | 2014-002237 A | | 1/2014 | |
| WO | WO-2007097176 A1 | * | 8/2007 | ............. G10L 15/06 |

OTHER PUBLICATIONS

Nagai, et al., "Japanese Word Formation Model and Its Evaluation", Transactions of Information Processing Society of Japan, vol. 34, No. 9, Sep. 15, 1993, 14 pages.

* cited by examiner

Fig. 3

| NOTATION | OCCU-RRENCE COST | LEFT CONTEXT CONCA-TENATION COST INDEX ID | LEFT CONTEXT CONCA-TENATION COST INDEX ID | PART OF SPEECH | SUBCLASSI-FICATION OF PART OF SPEECH 1 | ... | INFLECTED FORM | ... | BASE FORM | READING | PRONUN-CIATION |
|---|---|---|---|---|---|---|---|---|---|---|---|
| 朝日 | 7150 | 682 | 622 | NOUN | GENERAL | ... | * | ... | 朝日 | アサヒ | アサヒ |
| 昼食 | 7148 | 385 | 494 | NOUN | GENERAL | ... | * | ... | 昼食 | チュウショク | チュウショク |
| すずめ | 7150 | 285 | 618 | NOUN | GENERAL | ... | * | ... | すずめ | ヨウサイ | ヨウサイ |
| 京都 | 6875 | 885 | 622 | NOUN | GENERAL | ... | * | ... | 京都 | センチャ | センチャ |
| ... | ... | ... | ... | ... | ... | ... | ... | ... | ... | ... | ... |
| 走る | 5622 | 731 | 150 | VERB | INDEPENDENT | * | FIVE-LEVEL "RA" ROW | ... | 走る | ハシル | ハシル |
| 飛ぶ | 5494 | 733 | 148 | VERB | INDEPENDENT | * | FIVE-LEVEL "BA" ROW | ... | 飛ぶ | トブ | トブ |
| 歩き回る | 5618 | 732 | 475 | VERB | INDEPENDENT | * | FIVE-LEVEL "RA" ROW | ... | 歩き回る | アルキマワル | アルキマワル |
| ... | ... | ... | ... | ... | ... | ... | ... | ... | ... | ... | ... |
| ... | ... | ... | ... | ... | ... | ... | ... | ... | ... | ... | ... |

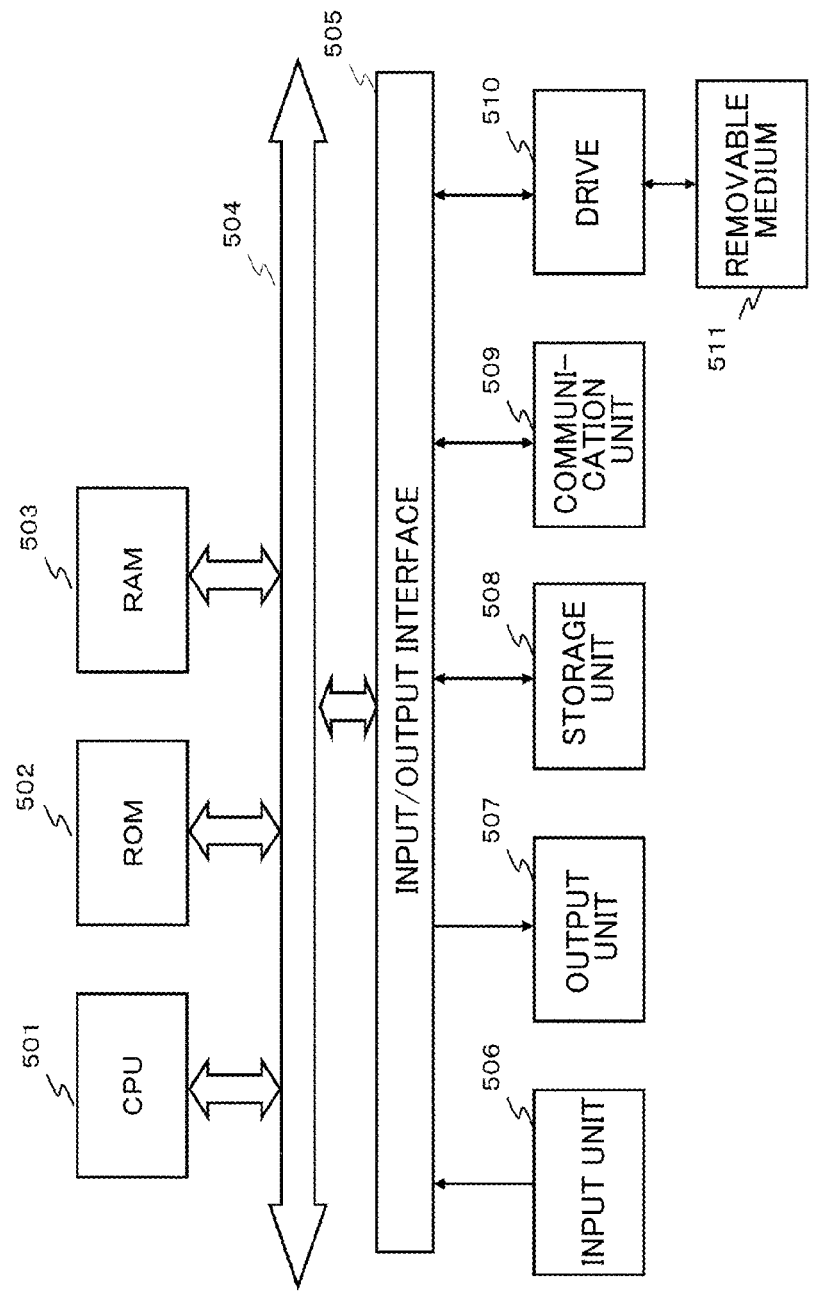

INFORMATION PROCESSING DEVICE, INFORMATION PROCESSING METHOD, AND PROGRAM

CROSS REFERENCE TO RELATED APPLICATIONS

This application is a U.S. National Phase of International Patent Application No. PCT/JP2020/015086 filed Apr. 1, 2020, which claims priority benefit of Japanese Patent Application No. JP 2019-101703 filed in the Japan Patent Office on May 30, 2019. Each of the above-referenced applications is hereby incorporated herein by reference in its entirety.

TECHNICAL FIELD

The present disclosure relates to an information processing device, an information processing method, and a program. More specifically, the present invention relates to an information processing device, an information processing method, and a program for generating a dictionary to be applied to morphological analysis and executing a morphological analysis process.

BACKGROUND ART

A morphological analysis process is known as one of document analysis processes. In the morphological analysis process, for example, the following processing is executed on the document to be analyzed.
  (a) Divide text into morphemes, which are the smallest meaningful units
  (b) Discriminate the part of speech of each morpheme
The morphological analysis process is a document analysis process that executes the above processing.

Morphological analysis is performed using a dictionary in which words in the analysis target language are registered. Notations of many morpheme candidates and their part-of-speech information are registered in the dictionary.

However, for words (unknown words) that are not registered in the dictionary, analysis is performed using another means such as implementation of a rule that determines division according to the character type for processing the unknown words.

When performing morphological analysis on a document in a specific specialized field, it is necessary to use a dictionary in which terms in that specialized field are registered. For example, in the case of medical documents, a dictionary containing medical technical terms is used.

Various dictionaries such as system dictionaries, which are general-purpose dictionaries used for morphological analysis of various documents regardless of field and user dictionaries and application dictionaries, which are dictionaries used for morphological analysis of documents in specific fields are used as dictionaries applied to morphological analysis.

By updating the dictionaries to register new words in these dictionaries as needed, it is possible to perform morphological analysis on documents of various new domains.

PTL 1 (JP 2014-002237 A) is an example of a conventional technique that discloses a word registration process for a dictionary.

This document discloses a structure in which unregistered words are added on the basis of the analysis result of the frequency of occurrence of unregistered words.

However, carelessly registering a word in the dictionary may lead to the collapse of the analysis result. Adding appropriate words often depends on the know-how and knowledge of skilled engineers, which is one of the difficult tasks for many users. The dictionary update process including works such as registration of new words such as unknown words often depends on manpower, and there is a problem that it is difficult to inherit the technique due to the retirement of engineers and lack of handing over.

CITATION LIST

Patent Literature

[PTL 1]
JP 2014-002237 A

SUMMARY

Technical Problem

The present disclosure has been made in view of the above problems, for example, and an object thereof is to provide an information processing device, an information processing method, and a program capable of generating and updating a dictionary used for morphological analysis without depending on the knowledge and experience of an expert.

An object of an embodiment of the present disclosure is to provide an information processing device, an information processing method, and a program that applies the dictionary generated by the above processing to execute highly accurate morphological analysis.

Solution to Problem

A first aspect of the present disclosure provides an information processing device including: a notation feature amount extraction unit that extracts a notation feature amount of a character string; a part-of-speech feature amount extraction unit that extracts a part-of-speech feature amount of the character string; and an occurrence cost estimation unit that receives the notation feature amount and the part-of-speech feature amount of the character string and calculates an occurrence cost of the character string by applying an occurrence cost regression model, wherein the occurrence cost is data used in a morphological analysis process, and the occurrence cost regression model is a learning model that estimates the occurrence cost from the notation feature amount and the part-of-speech feature amount of a character string, generated by a learning process using registration data of an existing morphological analysis dictionary as teacher data.

A second aspect of the present disclosure provides an information processing device including: an analysis text input unit that inputs text; and a morphological analysis process execution unit that executes a morphological analysis process on the text, wherein the morphological analysis process execution unit executes a morphological analysis process by applying a morphological analysis dictionary in which an occurrence cost of a morpheme unit is registered, and the morphological analysis dictionary used by the morphological analysis process execution unit is a dictionary in which additional registration is performed using an occurrence cost estimated by applying an occurrence cost regression model generated by a learning process which uses registration data of an existing morphological analysis dictionary as teacher data.

A third aspect of the present disclosure provides an information processing method executed in an information processing device, including: allowing a notation feature amount extraction unit to extract a notation feature amount of a character string; allowing a part-of-speech feature amount extraction unit to extract a part-of-speech feature amount of the character string; and allowing an occurrence cost estimation unit to receive the notation feature amount and the part-of-speech feature amount of the character string and calculate an occurrence cost of the character string by applying an occurrence cost regression model, wherein the occurrence cost calculated by the occurrence cost estimation unit is data used in a morphological analysis process, and the occurrence cost regression model applied by the occurrence cost estimation unit is a learning model that estimates the occurrence cost from the notation feature amount and the part-of-speech feature amount of a character string, generated by a learning process using registration data of an existing morphological analysis dictionary as teacher data.

A fourth aspect of the present disclosure provides an information processing method executed in an information processing device, including: allowing an analysis text input unit to input analysis target text; and allowing a morphological analysis process execution to execute a morphological analysis process on the input text by applying a morphological analysis dictionary in which an occurrence cost of a morpheme unit is registered, wherein the morphological analysis dictionary applied by the morphological analysis process execution unit is a dictionary in which an occurrence cost estimated by applying an occurrence cost regression model which is a learning model generated by a learning process which uses registration data of an existing morphological analysis dictionary as teacher data is registered.

A fifth aspect of the present disclosure provides a program for causing an information processing device to execute information processing, including: allowing a notation feature amount extraction unit to extract a notation feature amount of a character string; allowing a part-of-speech feature amount extraction unit to extract a part-of-speech feature amount of the character string; and allowing an occurrence cost estimation unit to receive the notation feature amount and the part-of-speech feature amount of the character string and calculate an occurrence cost of the character string by applying an occurrence cost regression model, wherein the occurrence cost calculated by the occurrence cost estimation unit is data used in a morphological analysis process, and the occurrence cost regression model applied by the occurrence cost estimation unit is a learning model that estimates the occurrence cost from the notation feature amount and the part-of-speech feature amount of a character string, generated by a learning process using registration data of an existing morphological analysis dictionary as teacher data.

A sixth aspect of the present disclosure provides a program for causing an information processing device to execute information processing, including: allowing an analysis text input unit to input analysis target text; and allowing a morphological analysis process execution to execute a morphological analysis process on the input text by applying a morphological analysis dictionary in which an occurrence cost of a morpheme unit is registered, wherein the morphological analysis dictionary applied by the morphological analysis process execution unit is a dictionary in which an occurrence cost estimated by applying an occurrence cost regression model which is a learning model generated by a learning process which uses registration data of an existing morphological analysis dictionary as teacher data is registered.

The program of the present disclosure is, for example, a storage medium provided in a computer-readable form or a program that can be provided by a communication medium, the storage medium or the program being provided to an information processing device or a computer system that can execute various program codes, for example. By providing such a program in a computer-readable form, processing according to the program can be realized on an information processing device or a computer system.

Still other objects, features and advantages of the present disclosure will become apparent by more detailed description on the basis of the embodiments of the present disclosure and the accompanying drawings described below. In the present specification, the system is a logical set of configurations of a plurality of devices, and the devices having each configuration are not limited to those in the same housing.

According to the configuration of one embodiment of the present disclosure, a configuration is realized in which the occurrence cost of an unknown word that is not registered in the morphological analysis dictionary is calculated by applying the occurrence cost regression model, which is a learning model.

Specifically, for example, the information processing device includes a notation feature amount extraction unit that extracts a notation feature amount of a character string, a part-of-speech feature amount extraction unit that extracts a part-of-speech feature amount of the character string, and an occurrence cost estimation unit that receives the notation feature amount and the part-of-speech feature amount and calculates an occurrence cost of the character string by applying an occurrence cost regression model. The occurrence cost regression model is a learning model that estimates the occurrence cost from the notation feature amount and the part-of-speech feature amount of a character string, generated by a learning process using registration data of an existing morphological analysis dictionary as teacher data.

With this configuration, a configuration is realized in which the occurrence cost of an unknown word that is not registered in a morphological analysis dictionary is calculated by applying the occurrence cost regression model, which is a learning model.

The effects described in the present specification are merely exemplary and not limited, and may have additional effects.

BRIEF DESCRIPTION OF DRAWINGS

FIG. 3 is a diagram illustrating a configuration example of a dictionary used for morphological analysis process.

FIG. 13 is a diagram illustrating a hardware configuration example of an information processing device.

DESCRIPTION OF EMBODIMENTS

Figure 1:
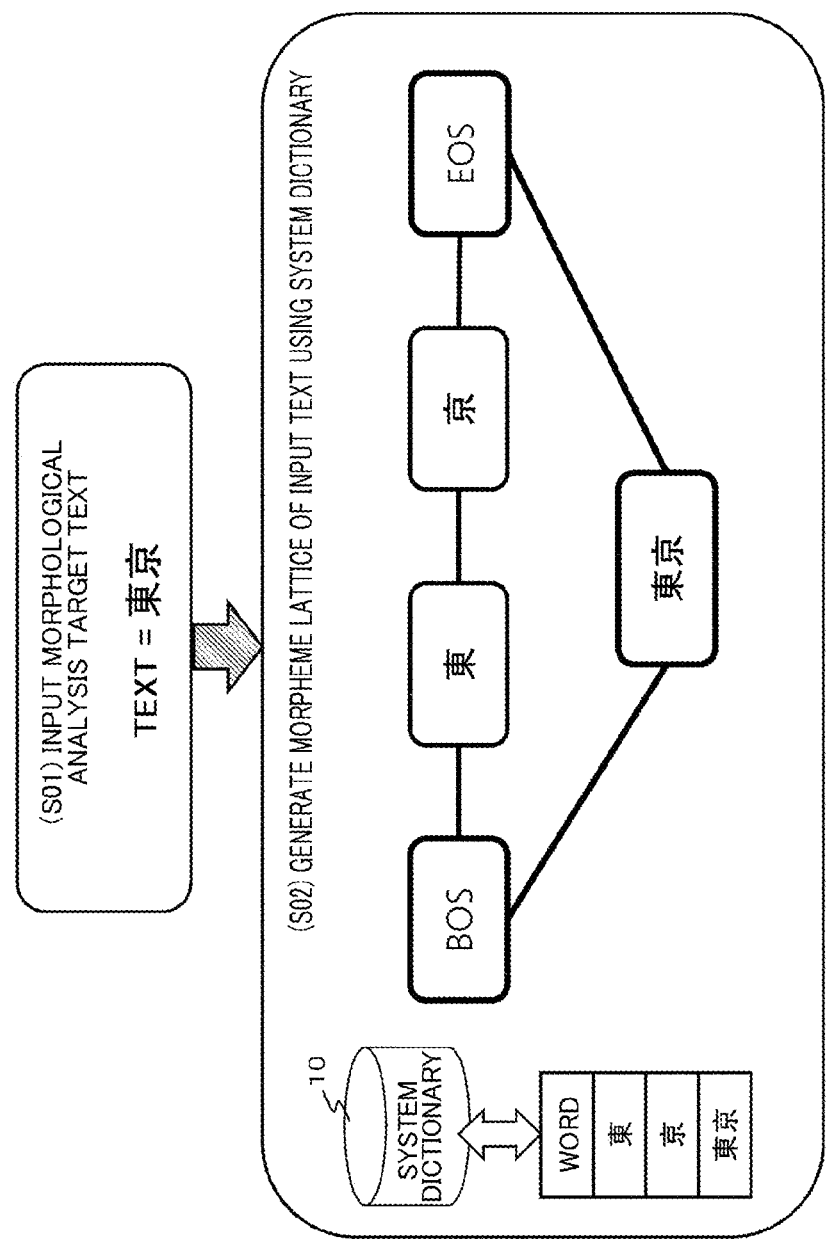
FIG. 1 is a diagram illustrating an outline of a morphological analysis process.

Hereinafter, the details of an information processing device, an information processing method, and a program of the present disclosure will be described with reference to the drawings. The explanation will be given according to the following items.

1. Outline of morphological analysis process and cost calculation in morphological analysis
2. Problem that morphological analysis of unknown words that are not registered in dictionary is not possible
3. Problems of dictionary registration of new morphemes that are not registered in dictionary
4. Information processing device that executes process of generating learning model that estimates occurrence cost
5. Information processing device that executes process of estimating occurrence cost using occurrence cost regression model
6. Information processing device that executes morphological analysis process using dictionary in which occurrence cost of new morpheme is registered
7. Configuration example of information processing device that generates and uses occurrence cost regression model and executes morphological analysis process
8. Hardware configuration example of information processing device
9. Summary of structure of present disclosure

1. Outline of Morphological Analysis Process and Cost Calculation in Morphological Analysis First, the outline of a morphological analysis process and the cost calculation in the morphological analysis will be described.

As described above, in the morphological analysis process, a process of dividing text into morphemes, which are the smallest meaningful units that constitute a document and a process of discriminating the part of speech of each morpheme are executed.

The morphological analysis is executed using a dictionary in which morpheme candidates which are elements (character strings) of the analysis target language are registered. Character string elements corresponding to many morphemes and their part-of-speech information are registered in the dictionary.

An example of the morphological analysis process will be described with reference to FIGS. 1 and 2.

Figure 2:
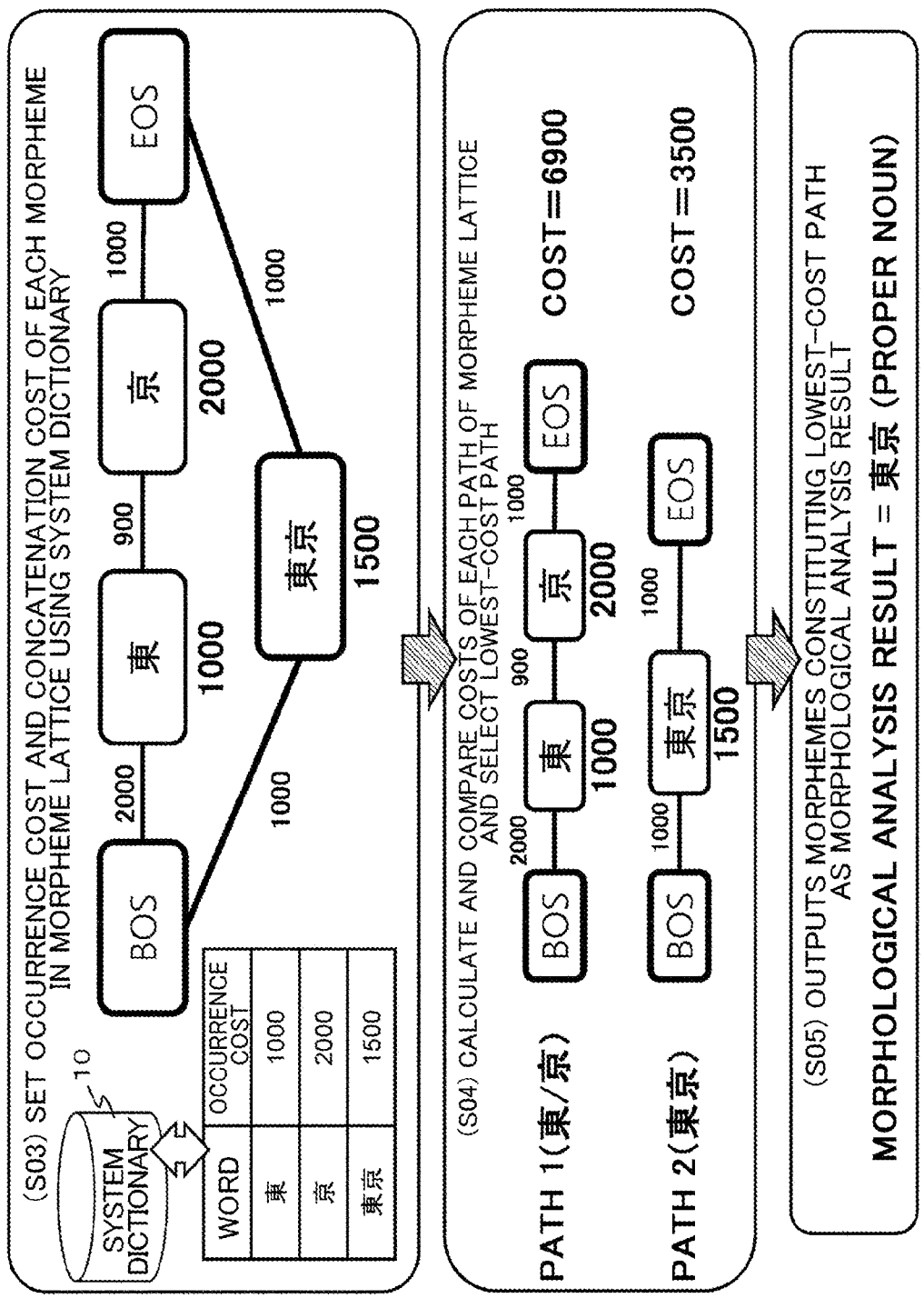
FIG. 2 is a diagram illustrating an outline of a morphological analysis process.

FIGS. 1 to 2 show the processes to be executed in the morphological analysis process in the order of steps S01 to S05 in chronological order.

Hereinafter, the processes of each step will be described in sequence.

(Step S01)

First, in step S01, the morphological analysis target text is input.

Here, the morphological analysis target text is "東京".

(Step S02)

Next, in step S02, a morpheme lattice of "東京", which is the morphological analysis target text, is generated.

The morpheme lattice is a diagram which analysis target text is divided into morpheme units and the connections of the characters of these morpheme units are concatenated by referring to a system dictionary 10, that is, a system dictionary in which elements (character strings) that are candidates for morphemes included in the analysis target language are registered.

FIG. 1 (S02) shows a morpheme lattice for the morphological analysis target text="東京".

In the system dictionary 10, three types of morpheme candidates of "東", "京", and "東京" are registered.

In this case, these three morpheme candidates are arranged according to a character string between the beginning of the sentence (BOS: Beginning of Sentence) and the end of the sentence (EOS: End Of Sentence), and characters are concatenated.

The route from BOS to EOS is called a path.

The following two paths are set in the morpheme lattice shown in FIG. 1 (S02).

(Path 1) BOS- 東·京 -EOS
(Path 2) BOS- 東京 -EOS (Path 1) is a path in which these two morphemes of "東" and "京" are set.

(Path 2) is a path in which one morpheme of "東京" is set.

Hereinafter, in step S03 and subsequent steps, a process of determining which of these two paths is more probable will be performed.

(Step S03)

Next, in step S03 shown in FIG. 2, the "occurrence cost" and "concatenation cost" of each morpheme are set in the morpheme lattice using the system dictionary 10.

The "occurrence cost" is a value indicating the likelihood of appearance of each morpheme. The lower the value of "occurrence cost" (closer to 0), the more likely it is to appear. The higher the value of "occurrence cost", the less likely it is to appear.

The "concatenation cost" is a value indicating the likelihood of connection with adjacent morphemes before and after one morpheme. The lower the value of "concatenation cost" (closer to 0), the more likely it is for two adjacent morphemes to be connected. The higher the value of "concatenation cost", the less likely it is for two adjacent morphemes to be connected.

The "concatenation cost" has a different value depending on the characters of other morphemes before and after the morpheme.

These "occurrence cost" and "concatenation cost" are registered in the system dictionary 10 as information for each morpheme unit.

A specific data structure example of the system dictionary 10 is shown in FIG. 3.

As shown in FIG. 3, for example, the following pieces of data are recorded in correlation in a morpheme dictionary.

Notation,
Occurrence cost,
Left context concatenation cost index ID,
Right context concatenation cost index ID,
Part of speech,
Subclassification of part of speech,
Inflected form,
Base form,
Reading,
Pronunciation, The example shown in FIG. 3 is an example of a morpheme dictionary, and morpheme dictionaries may have various different data formats.

The notation is a character string notation of a morpheme.

As described above, the occurrence cost is a value indicating the likelihood of appearance of morphemes. The lower the value, the more likely it is to appear.

The left context concatenation cost index ID and the right context concatenation cost index ID are index IDs for another list data in which the "concatenation cost" is recorded. Different values are set for the "concatenation cost" depending on the morphemes before and after, and the list data in which the concatenation cost data is recorded is registered in the system dictionary 10 separately from the list data shown in FIG. 3.

The left context concatenation cost index ID and the right context concatenation cost index ID are index IDs for the concatenation cost list data. According to this ID, an entry of one morpheme can be selected from the concatenation cost list data, and the concatenation cost with various morphemes before and after the morpheme can be obtained from the entry.

The part of speech is part-of-speech information of morphemes, and part-of-speech information such as nouns, proper nouns, verbs, adjectives, adverbs, and conjunctions is recorded. In addition, information such as subclassification of part of speech, inflected form, base form, reading, pronunciation, and the like is recorded.

Next, the process of (step S03) of FIG. 2 will be described.

In step S03, the "occurrence cost" and the "concatenation cost" of each morpheme are set in the morpheme lattice using the system dictionary 10 in which the data described with reference to FIG. 3 is recorded.

In FIG. 2 (S03), the occurrence costs of the three morphemes of "東", "京", and "東京" of the following two paths are set as follows.

(Path 1) BOS- 東-京 -EOS
(Path 2) BOS- 東京 -EOS
Occurrence cost of "東"=1000
Occurrence cost of "京"=2000
Occurrence cost of "東京"=1500

As described above, the "occurrence cost" is a value indicating the likelihood of appearance of each morpheme. The lower the value of "occurrence cost" (closer to 0), the more likely it is to appear. The higher the value of "occurrence cost", the less likely it is to appear.

That is, the values of the occurrence costs are as follows.

"東" < "東京" < "京"

In the example shown, the order of morphemes that are likely to appear is "東", "東 京", and "京".

The values of the concatenation cost are as follows.

Concatenation cost when "東" is set at the beginning of the sentence=2000

Concatenation cost when "京" is connected after "東"=900

Concatenation cost when "京" is set at the end of the sentence=1000

Concatenation cost when "東京" is set at the beginning of the sentence=1000

Concatenation cost when "東京" is set at the end of the sentence=1000 These concatenation costs are acquired from the system dictionary 10 and set.

As described above, the "concatenation cost" is a value indicating the likelihood of connection with adjacent morphemes before and after the morpheme. The lower the value of "concatenation cost" (closer to 0), the more likely it is for two adjacent morphemes to be connected. The higher the value of "concatenation cost", the less likely it is for two adjacent morphemes to be connected.

The "concatenation cost" has a different value depending on the connection of a part of speech between morphemes.

(Step S04)

Next, in step S04, the cost of each path is calculated.

The cost of each path is the total value of the occurrence cost of the morpheme of each path and the concatenation cost of the connection lines constituting the path.

The costs of the following two paths shown in FIG. 2 (S04) are calculated.

(Path 1) BOS- 東-京 -EOS
(Path 2) BOS- 東京 -EOS

In the case of (Path 1) BOS- 東-京 -EOS, the cost is calculated as follows.

Cost of Path 1=2000+1000+900+2000+1000=6900

On the other hand, in the case of (Path 2) BOS- 東京 -EOS, the cost is calculated as follows.

Cost of Path 2=1000+1500+1000=3500

(Step S05)

Next, in step S05, the costs of the paths calculated in step S04 are compared, the path having the lowest cost is selected, and the morpheme constituting the selected path having the lowest cost is selected as the morpheme of the morphological analysis result.

The morphological analysis result includes the morpheme constituting the selection path and its part-of-speech information. The part-of-speech information and the like are acquired from the system dictionary 10.

In the example shown in FIG. 2, the cost of Path 2 is lower than the cost of Path 1 and is selected as the path having the lowest cost.

The morpheme included in Path 1 is "東京", and this "東京" is selected as the morpheme as the morphological analysis result of the processing target text="東京". The part-of-speech information of "proper noun" of the morpheme of "東京" is acquired from the system dictionary 10, and the following morphological analysis result is output.

Morphological analysis result=東京 (proper noun)

2. Problem that Morphological Analysis of Unknown Words that are not Registered in Dictionary is not Possible Next, the problem that the morphological analysis of unknown words that are not registered in the dictionary is not possible will be described.

The outline of the morphological analysis process has been described with reference to FIGS. 1 to 3. As can be understood from the above description, the morphological analysis process is executed using the information registered in the system dictionary.

Therefore, there is a problem that morphemes that are not registered in the system dictionary cannot be output as the analysis result.

This problem will be described with reference to FIG. 4.

Figure 4:
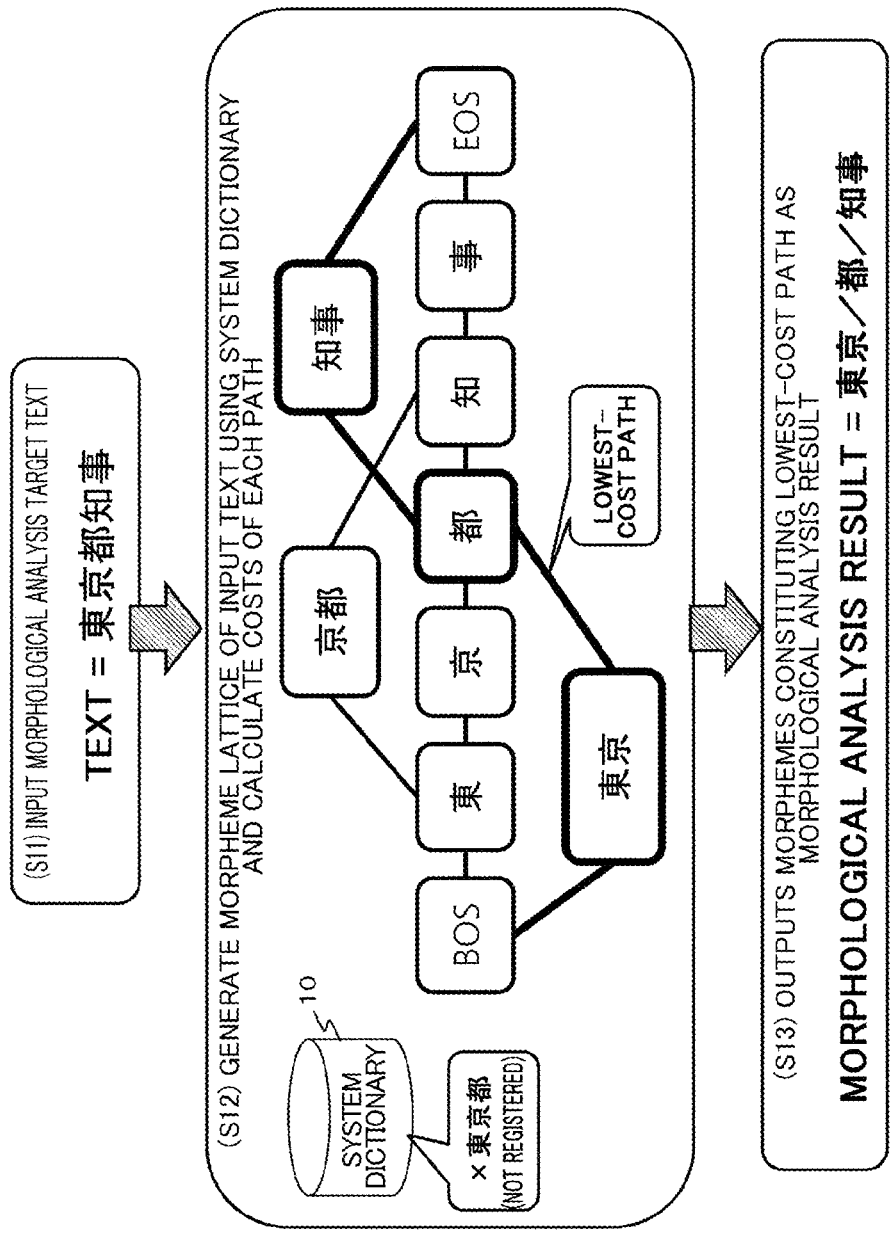
FIG. 4 is a diagram illustrating an example in which morphological analysis of an unknown word that is not registered in the dictionary cannot be performed.

In the example shown in FIG. 4, it is assumed that the morphological analysis target text= 東京都知事, and morphological analysis is performed with the intention of outputting the part-of-speech information of these two morphemes of " 東京都 " and " 知事 ".

However, the system dictionary 10 used here has not registered therein the information of the morpheme of " 東京都 ". In this case, the morphological analysis result intended by the user cannot be obtained.

The processes of morphological analysis steps S11 to S13 shown in FIG. 4 will be described.

(Step S11)

In step S11, the morphological analysis target text is input.

Here, the morphological analysis target text is "東京都知事".

(Step S12)

Next, in step S12, a morpheme lattice of "東京", which is the morphological analysis target text, is generated, and an adoption cost path is selected.

FIG. 4 (S12) shows the morpheme lattice for the morphological analysis target text= "東京都知事".

However, "東京都" is not registered as a morpheme in the system dictionary 10.

In this case, the morpheme lattice generated using the morpheme information registered in the system dictionary 10 has the following three paths.

(Path 1) BOS- 東·京·都·知·事 -EOS
(Path 2) BOS- 東·京都·知·事 -EOS
(Path 3) BOS- 東京·都·知事 -EOS (Path 1) is a path in which these five morphemes of "東","京","都","知", and "事" are set as morphemes.

(Path 2) is a path in which these four morphemes "東","京都","知", and "事" are set as morphemes.

(Path 3) is a path in which these three morphemes of "東京","都", and "知事" are set as morphemes.

Since "東京都" is not registered as a morpheme in the system dictionary 10, a path including the morpheme "東京都" is not generated.

The "occurrence cost" and the "concatenation cost" described above are set for each of Paths 1 to 3, and the cost of each path is calculated.

The cost of each path is the total value of the occurrence cost of the morpheme of each path and the concatenation cost of the connection lines constituting the path.

(Step S13)

Finally, in step S13, the costs of the paths calculated in step S12 are compared, the path having the lowest cost is selected, and the morpheme constituting the selected path having the lowest cost is selected as the morpheme of the morphological analysis result.

It is assumed that Path 3 is selected as the lowest-cost path.

(Path 3) BOS-東京·都·知事 -EOS

As a result, the morpheme constituting Path 3 and its part-of-speech information are output as the morphological analysis result.

That is,

Morpheme= "東京", "都", "知事"

These three morphemes and their part-of-speech information are output as the morphological analysis result.

However, this morphological analysis result is different from the morphological analysis result intended by the user.

The user performs morphological analysis with the intention of outputting the part-of-speech information of these two morphemes of "東京都" and "知事", and the morphological analysis result obtained as the processing result of steps S11 to S13 is different from the result intended by the user.

As described above, if the information registered in the system dictionary is insufficient, an accurate morphological analysis result may not be obtained.

In particular, it is highly likely that new words such as product names, place names, item names, or technical terms are not registered in the system dictionary, and when text containing such new words and the like is input, the morphological analysis result intended by the user may not be generated.

3. Problems of Dictionary Registration of New Morphemes that are not Registered in Dictionary Next, the problem of the dictionary registration of new morphemes that are not registered in the dictionary will be described.

As mentioned above, it is highly likely that new words such as new product names, place names, item names, or technical terms are not registered in the system dictionary, and when text containing such new words is input, the morphological analysis result intended by the user cannot be generated.

In order to solve this problem, a system dictionary or a user dictionary (application dictionary) in which morphemes that are not registered in the system dictionary are registered may be generated, and morphological analysis may be performed using the dictionary.

However, as a problem when registering new morphemes in a dictionary, there is a problem that it is difficult to estimate the "occurrence cost" corresponding to the new morpheme.

This problem will be described with reference to FIG. 5.

Figure 5:
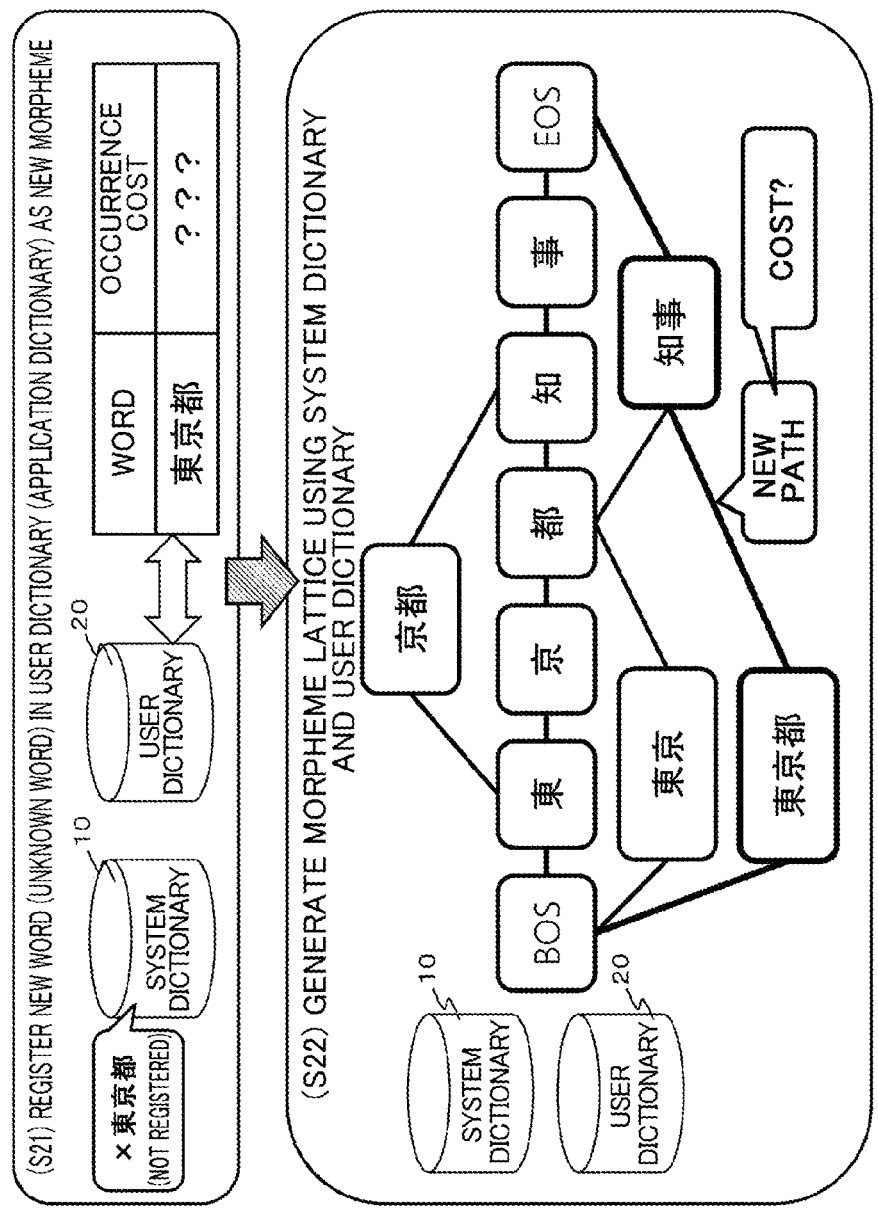
FIG. 5 is a diagram illustrating an example in which morphological analysis of an unknown word that is not registered in the dictionary cannot be performed.

The example shown in FIG. 5 is a processing example in the case of performing a process of registering the morpheme "東京都" which is not registered in the system dictionary 10 in the user dictionary 20.

The same process is performed when a new morpheme "東京都" is registered in the system dictionary 10.

Here, an example of registering a new morpheme in a user-specific dictionary for use by a user will be described. A general-purpose dictionary used regardless of the field is often called a system dictionary, and a dictionary used exclusively for documents in a specific field is often called a user dictionary or an application dictionary.

As shown in FIG. 5 (step S21), the morpheme "東京都" is not registered in the system dictionary 10.

This morpheme "東京都" is registered in the user dictionary 20.

However, in the dictionary used for morphological analysis, it is necessary to record the "occurrence cost" as data correlated with a notation character string serving as a morphological element.

The "occurrence cost" is a value indicating the likelihood of each morpheme to appear, as described above. The lower the value of "occurrence cost" (closer to 0), the more likely it is to appear. The higher the value of "occurrence cost", the less likely it is to appear.

However, the "occurrence cost" of a new morpheme= "東京都" is not registered in the system dictionary 10, and must be determined by the user who creates the user dictionary 20.

Unless the "occurrence cost" of this new morpheme= "東京都" is determined and recorded in the user dictionary 20, the cost cannot be calculated and the morphological analysis process cannot be performed for a new path including the morpheme "東京都" of the morpheme lattice shown in (step S22) of FIG. 5.

An expert in document analysis may be able to estimate approximate values, but it is difficult and impossible to estimate the correct occurrence costs for all new morphemes. Especially for users who do not have knowledge in morphological analysis, it is almost impossible to estimate the value of "occurrence cost".

Figure 6:
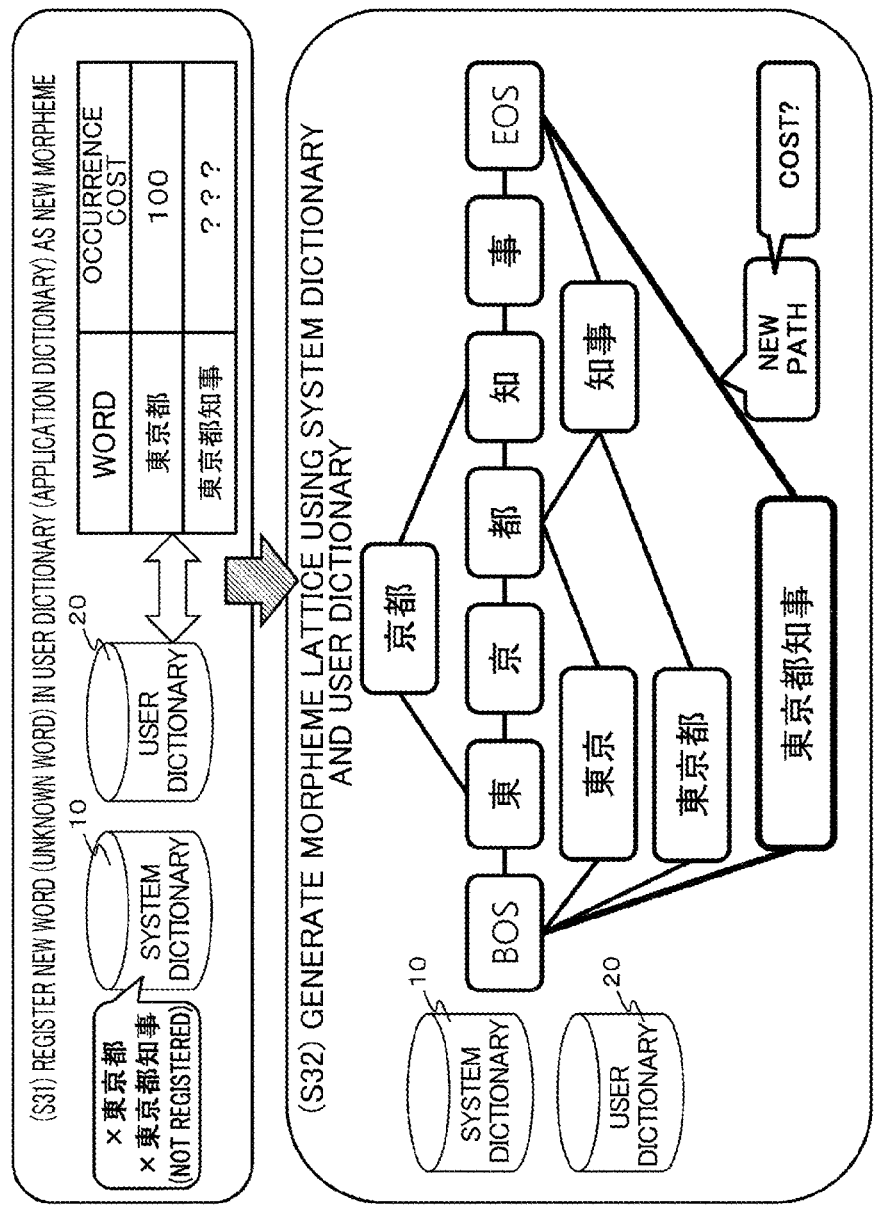
FIG. 6 is a diagram illustrating an example in which morphological analysis of an unknown word that is not registered in the dictionary cannot be performed.

FIG. 6 is a diagram for explaining the same problem.

The example shown in FIG. 6 is a processing example in which the morpheme "東京 都知事" that is not registered in the system dictionary 10 is registered in the user dictionary 20.

It is assumed that "東京都" is registered in the user dictionary 20 and the cost value of "100" is set by an expert's estimation for the occurrence cost.

As shown in FIG. 6 (step S31), neither the morpheme "東京都" nor "東京都知事" is registered in the system dictionary 10.

It is assumed that "東京都" and its occurrence cost "100" are set in the user dictionary by an expert's estimation.

Further, a new morpheme "東京都知事" is registered in the user dictionary 20.

The "occurrence cost" of this new morpheme= "東京都知事" is not registered in the system dictionary 10, and must be determined by the user who creates the user dictionary 20.

Unless the "occurrence cost" of this new morpheme= "東京都知事" is determined and recorded in the user dictionary 20, the cost cannot be calculated and the morphological analysis process cannot be performed for a new path including the morpheme "東京都知事" of the morpheme lattice shown in (step S32) of FIG. 6. However, it is almost impossible for a general user who does not have knowledge in morphological analysis to estimate the value of "occurrence cost".

When registering a new morpheme in a dictionary, it is necessary to correctly estimate and register the "occurrence cost" corresponding to the newly registered morpheme in order to output a highly accurate morphological analysis result.

4. Information Processing Device that Executes Process of Generating Learning Model that Estimates Occurrence Cost Next, as an embodiment of the information processing device of the present disclosure, an information processing device that executes a process of generating a learning model for estimating the occurrence cost will be described.

Figure 7:
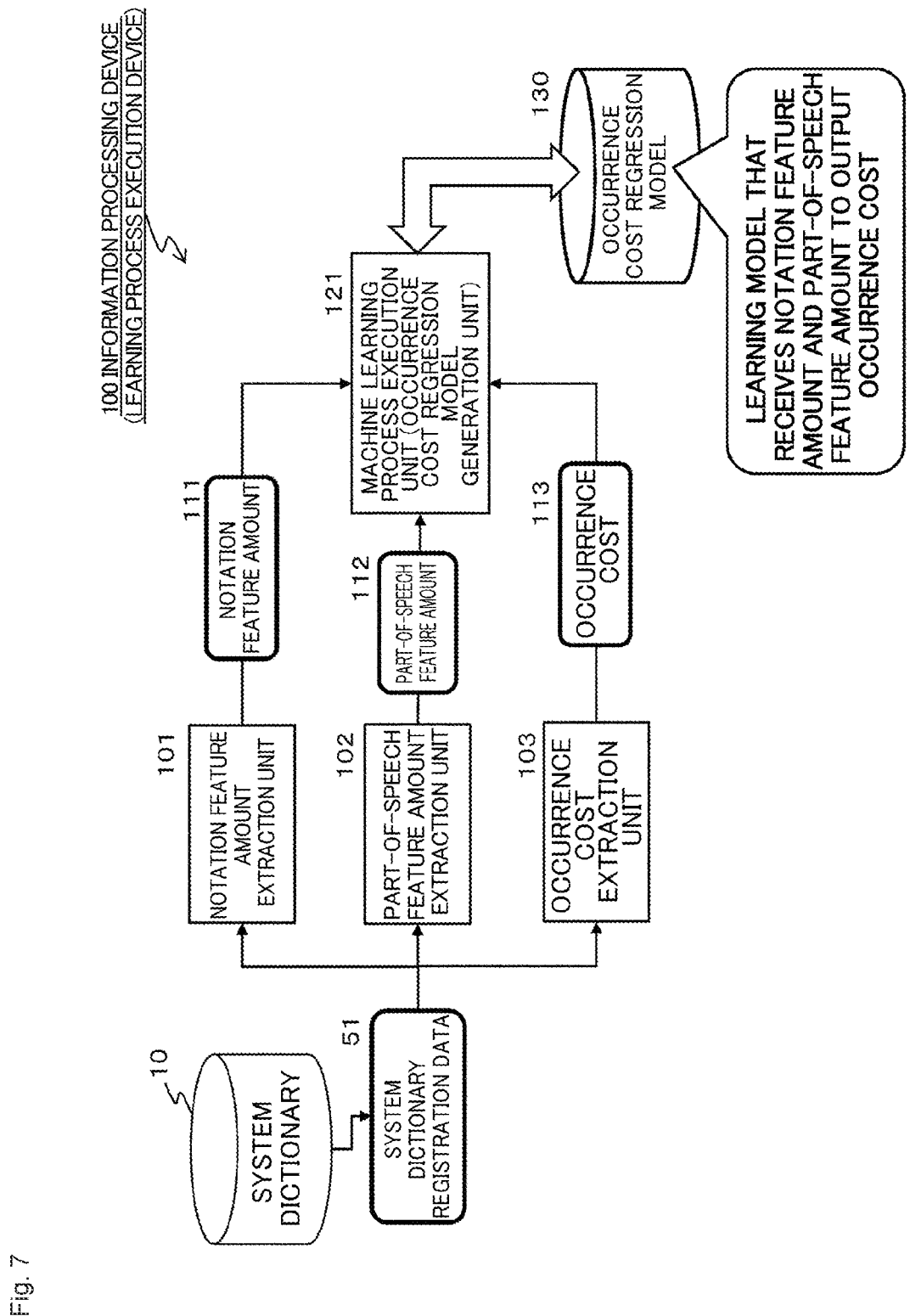
FIG. 7 is a diagram illustrating a configuration example of the information processing device (learning process execution device) of the present disclosure.

FIG. 7 is a block diagram showing a configuration example of an information processing device (learning process execution device) 100 that executes a process of generating a learning model for estimating the occurrence cost.

The information processing device 100 acquires the registration data of an existing morphological analysis dictionary, for example, the system dictionary 10 having the registration data described with reference to FIG. 3, and executes a machine learning process using the acquired data as teacher data to generate an "occurrence cost regression model" which is a learning model.

The "occurrence cost regression model" is a learning model that receives a notation feature amount and a part-of-speech feature amount of a certain morpheme and outputs the "occurrence cost" of the morpheme.

Figure 8:
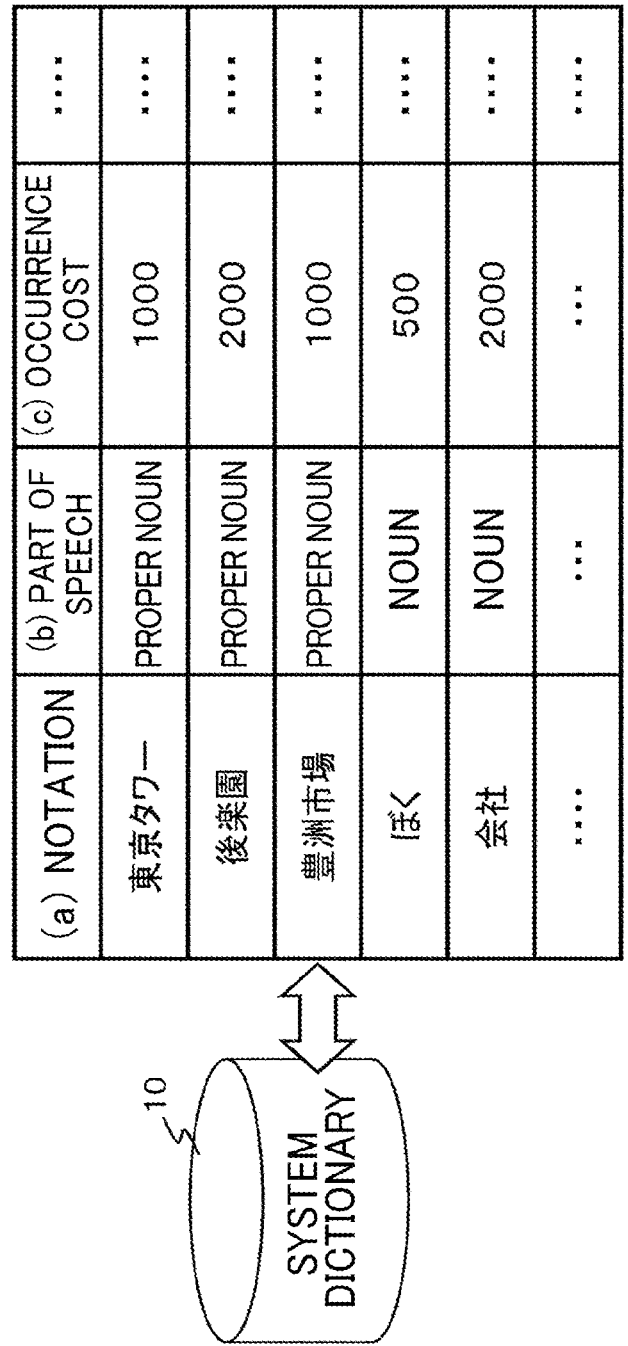
FIG. 8 is a diagram illustrating an example of the data registered in a system dictionary used for the learning process.

In the system dictionary 10, for example, as shown in FIG. 8, corresponding data such as notations, occurrence costs, and parts of speech related to morphemes are recorded for a large number of morphemes. In addition, in the system dictionary 10, not only these pieces of data but also the data described with reference to FIG. 3, that is, the notation, the occurrence cost, the left context concatenation cost index ID, the right context concatenation cost index ID, part of speech, subclassification of part of speech, inflected form, base form, reading, and pronunciation, for example, are registered in correlation.

The information processing device 100 sequentially reads out the registration data of these existing morphological analysis dictionaries, that is, the system dictionary registration data 51 shown in FIG. 7, executes a learning process to create an "occurrence cost regression model," which is a learning model.

The information processing device 100 acquires the following three types of information from the system dictionary registration data 51 of the system dictionary 10.

(1) Notation feature amount 111,
(2) Part-of-speech feature amount 112,
(3) Occurrence cost 113, These pieces of data are acquired as teacher data to be applied to a learning process.

A notation feature amount extraction unit 101 shown in FIG. 7 extracts a notation feature amount 111 from the system dictionary registration data 51 of the system dictionary 10 and outputs the notation feature amount 111 to a machine learning process execution unit (occurrence cost regression model generation unit) 121. The notation feature amount extracted by the notation feature amount extraction unit 101 is, for example, the feature amount of a notation of the morpheme registered in the system dictionary 10, for example, a feature amount including at least one of a character type, a composition, words used, and length of the morpheme.

Specifically, for example, the extracted feature amount of the morpheme notation indicates whether the notation of the morpheme registered in the dictionary corresponds to any one of the following notations (a), (b), . . . , and so on.

(a) Kanji only
(b) Hiragana only
(c) Katakana only
(d) Alphabet only
(e) Numbers only
(d) Kanji and Hiragana
(e) Kanji and Katakana
(f) Hiragana and Katakana In addition to the notation feature amounts of the above character types, other notation feature amounts such as the number of characters and the words used may be extracted.

A part-of-speech feature amount extraction unit 102 extracts a part-of-speech feature amount 112 from the system dictionary registration data 51 of the system dictionary 10 and outputs the part-of-speech feature amount 112 to the machine learning process execution unit (occurrence cost regression model generation unit) 121.

The part-of-speech feature amount extracted by the part-of-speech feature amount extraction unit 102 is, for example, the feature amount of the part of speech of the morpheme registered in the system dictionary 10.

Specifically, the part-of-speech feature amount indicates whether the part of speech of the morpheme registered in the system dictionary 10 corresponds to a part of speech such as a noun, a proper noun, a verb, an adjective, an adverb, or a conjunction.

Further, on the basis of the left context concatenation cost index ID and the right context concatenation cost index ID set as the morpheme registration data, the part of speech of the corresponding registered concatenated words before and after one morpheme may be acquired as the corresponding part-of-speech feature amount of one morpheme.

The acquired part-of-speech feature amount is output to the machine learning process execution unit (occurrence cost regression model generation unit) 121.

An occurrence cost extraction unit 103 extracts an occurrence cost 113 from the system dictionary registration data 51 of the system dictionary 10 and outputs the occurrence cost 113 to the machine learning process execution unit (occurrence cost regression model generation unit) 121.

The occurrence cost extracted by the occurrence cost extraction unit 103 is the value of the occurrence cost of the morpheme registered in the system dictionary 10.

The machine learning process execution unit (occurrence cost regression model generation unit) 121 receives the following data.
(1) Notation feature amount 111 extracted by the notation feature amount extraction unit 101,
(2) Part-of-speech feature amount 112 extracted by the part-of-speech feature amount extraction unit 102,
(3) Occurrence cost 113 extracted by the occurrence cost extraction unit 103, These three types of data are input to the machine learning process execution unit (occurrence cost regression model generation unit) 121 as corresponding data of one morpheme unit.

The machine learning process execution unit (occurrence cost regression model generation unit) 121 sequentially receives the data sets (1) to (3) for tens of thousands to hundreds of thousands of morphemes registered in the system dictionary 10 and executes a machine learning process using these data sets as teacher data to generate a learning model, that is, an occurrence cost regression model 130.

The occurrence cost regression model 130 is a learning model that receives a notation feature amount and a part-of-speech feature amount of a certain morpheme and outputs the "occurrence cost" of the morpheme.

The machine learning process execution unit (occurrence cost regression model generation unit) 121 learns the correspondence between the two pieces of feature amount data of (1) notation feature amount 111 extracted by the notation feature amount extraction unit 101 and (2) part-of-speech feature amount 112 extracted by the part-of-speech feature amount extraction unit 102 and (3) occurrence cost 113 extracted by the occurrence cost extraction unit 103 for each morpheme to be input as learning data.

The machine learning process execution unit (occurrence cost regression model generation unit) 121 learns the correspondence between the data sets of (1) notation feature amount and (2) part-of-speech feature amount and (3) occurrence cost for tens of thousands to hundreds of thousands of morphemes registered in the system dictionary 10. By this learning process, a learning model, that is, the occurrence cost regression model 130 that receives a notation feature amount and a part-of speech feature amount of a certain morpheme and outputs the "occurrence cost" of the morpheme, is generated.

Various algorithms can be used as machine learning algorithms. For example, Gaussian process, Bayesian neural network, support vector machine (SVM: Support Vector Machine), logistic regression and the like can be used.

The "occurrence cost regression model 130" generated by the machine learning process execution unit 121 of the information processing device 100 shown in FIG. 7 is a learning model that receives the notation feature amount and the part-of speech feature amount of a certain morpheme and outputs the "occurrence cost" of the morpheme. However, the machine learning process execution unit 121 may be configured to generate a model that receives the notation feature amount and the part-of-speech feature amount of a certain morpheme and calculates two types of costs of "occurrence cost" and "concatenation cost" of the morpheme.

5. Information Processing Device that Executes Process of Estimating Occurrence Cost Using Occurrence Cost Regression Model Next, an information processing device that executes a process of estimating the occurrence cost using the occurrence cost regression model will be described.

Figure 9:
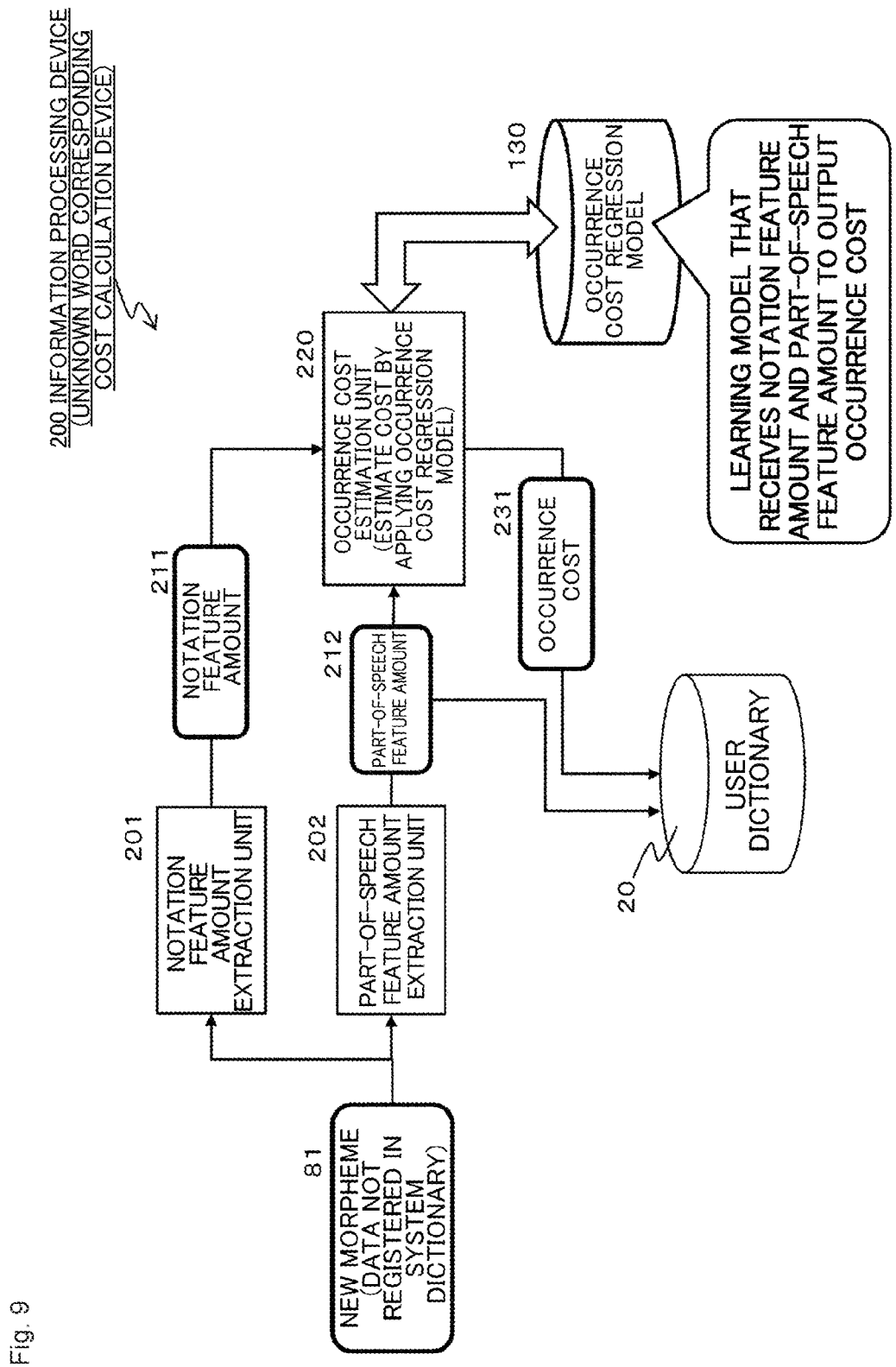
FIG. 9 is a diagram illustrating a configuration example of the information processing device (unknown word corresponding cost calculation device) of the present disclosure.

FIG. 9 is a block diagram showing a configuration example of an information processing device (unknown word corresponding cost calculation device) 200 that executes a process of estimating an occurrence cost using the occurrence cost regression model.

The information processing device 200 receives a new morpheme 81, which is an unknown word that is not registered in an existing morphological analysis dictionary, for example, the system dictionary 10, and estimates the occurrence cost of the new morpheme 81.

For this occurrence cost estimation process, the "occurrence cost regression model 130" generated by the information processing device 100 described with reference to FIG. 7 is used.

As described above, the "occurrence cost regression model" is a learning model that receives the notation feature amount and the part-of-speech feature amount of a certain morpheme and outputs the "occurrence cost" of the morpheme.

First, the information processing device 200 acquires the following two types of feature amounts on the basis of the new morpheme 81 which is the input data.
(1) Notation Feature Amount 211,
(2) Part-of-Speech Feature Amount 212.

The notation feature amount extraction unit 201 shown in FIG. 9 extracts the notation feature amount 211 from the new morpheme 81 which is the input data, and outputs the notation feature amount 211 to the occurrence cost estimation unit 220.

The notation feature amount that the notation feature amount extraction unit 201 extracts from the new morpheme 81 which is the input data is the feature amount of the notation of the new morpheme 81 (for example, the feature amount including at least one of the character type, composition, words used, and length of the morpheme).

Specifically, the extracted feature amount indicates whether the notation of the new morpheme 81 corresponds to any one of the followings notations.

(a) Kanji only
(b) Hiragana only
(c) Katakana only
(d) Alphabet only
(e) Numbers only
(d) Kanji and Hiragana
(e) Kanji and Katakana
(f) Hiragana and Katakana The notation feature amount extraction unit 201 extracts the notation feature amount 211 indicating whether the notation of the new morpheme 81 corresponds to any one of the notations (a), (b), • . . . , and so on.

The notation feature amount extraction unit 201 may extract not only the notation feature amounts of the above character types but also other notation feature amounts such as the number of characters of the new morpheme 81 and the words used.

The extraction target data of the notation feature amount extraction unit 201 is data according to the configuration of the learning model used for the occurrence cost estimation in the occurrence cost estimation unit 220, that is, the "occurrence cost regression model 130".

If the "occurrence cost regression model 130" is a model that estimates the occurrence cost on the basis of not only the notation feature amount of the character type but also other notation feature amounts such as the number of characters and the words used, the notation feature amount extraction unit 201 also extracts other notation feature amounts such as the number of characters of the new morpheme 81 and the words used.

The part-of-speech feature amount extraction unit 202 extracts the part-of-speech feature amount 212 from the new morpheme 81 and outputs the part-of-speech feature amount 212 to the occurrence cost estimation unit 220.

The part-of-speech feature amount extracted by the part-of-speech feature amount extraction unit 202 is, for example, the feature amount of the part of speech of the new morpheme 81.

Specifically, for example, the part-of-speech feature amount indicates whether the part of speech of the new morpheme 81 corresponds to a part of speech such as a noun, a proper noun, a verb, an adjective, an adverb, or a conjunction.

The part-of-speech feature amount extraction unit 202 may analyze the part of speech of the morpheme of the concatenated word that can be concatenated before and after the new morpheme 81 and acquire the part of speech of these concatenated words as the part-of-speech feature corresponding to the new morpheme 81.

The acquired part-of-speech feature amounts are output to the occurrence cost estimation unit 220.

The occurrence cost estimation unit 220 receives the following data.

(1) Notation feature amount 211 of the new morpheme 81 extracted by the notation feature amount extraction unit 201
(2) Part-of-speech feature amount 212 of the new morpheme 81 extracted by the part-of-speech feature amount extraction unit 202

The occurrence cost estimation unit 220 inputs these pieces of feature amount data to the occurrence cost regression model 130, estimates the value of the "occurrence cost" on the basis of these pieces of feature amount data, and outputs the value.

As described above, the "occurrence cost regression model 130" is a learning model that receives a notation feature amount and a part-of-speech feature amount of a certain morpheme and outputs the "occurrence cost" of the morpheme. The "occurrence cost regression model 130" can acquire the estimated value of the "occurrence cost" corresponding to the new morpheme 81 by inputting (1) the notation feature amount 211 and (2) the part-of-speech feature amount 212 of the new morpheme 81.

The occurrence cost estimation unit 220 uses the occurrence cost regression model 130 to acquire the estimated value of the "occurrence cost" corresponding to the new morpheme 81 from the notation feature amount 211 and the part-of-speech feature amount 212, which is the feature amount data of the new morpheme 81. The acquired "occurrence cost" value is recorded in correlation with the registration data of the new morpheme 81 of the user dictionary 20.

By these processes, the occurrence cost of a new morpheme that is not registered in the system dictionary 10 can be calculated and registered in the user dictionary. Since this occurrence cost calculation process is a process executed using a learning model, that is, the occurrence cost regression model 130, even a user who is not an expert in morphological analysis can easily estimate the occurrence cost corresponding to a new morpheme.

In the user dictionary 20, new morphemes that are not registered in the system dictionary 10 can be registered together with the occurrence cost. For example, the user dictionary 20 can be updated as shown in FIGS. 10A and 10B.

Figure 10A:
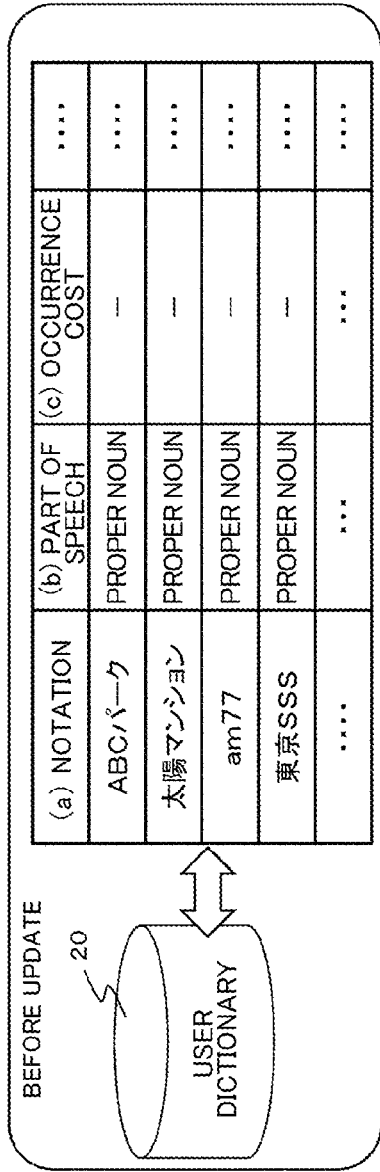
FIGS. 10A and 10B are diagrams illustrating an example of user dictionary data updated by a process executed by the information processing device (unknown word corresponding cost calculation device) of the present disclosure.

FIG. 10A shows the data structure of the user dictionary 20 before registration of the occurrence cost, that is, the user dictionary 20 before the update.

Figure 10B:
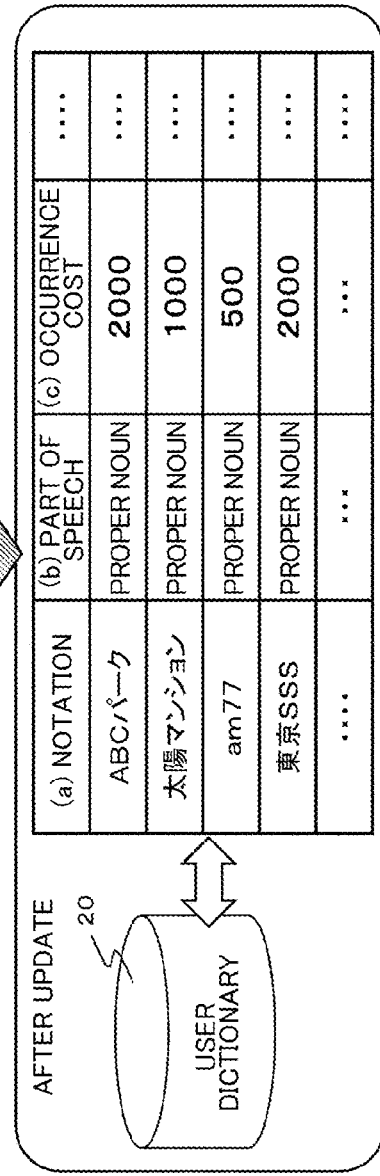

FIG. 10B shows the data structure of the user dictionary 20 after registration of the occurrence cost calculated by the process executed by the information processing device 200 shown in FIG. 9 in the user dictionary 20, that is, after updating.

In the registration data of the user dictionary 20 before the update of FIG. 10A, each piece of information of (a) notation and (b) part of speech of a new morpheme that is not registered in the system dictionary 10 is recorded, but (c) occurrence cost is not recorded, (a) Notation data and (b) part of speech of the new morpheme are registered by the user. Regarding (b) part of speech, the part-of-speech information analyzed by the part-of-speech feature amount extraction unit 202 of the information processing device 200 shown in FIG. 9 may be recorded.

The occurrence cost of the new morpheme 81 is calculated by the process of estimating the occurrence cost of the new morpheme 81 using the information processing device 200 shown in FIG. 9, that is, the process of applying the occurrence cost estimation model 130.

The data shown in FIG. 10B is the configuration data of the user dictionary 10 in which the occurrence cost of the new morpheme estimated by this process is registered, As described above, by applying the information processing device 200 shown in FIG. 9, it is possible to easily and highly accurately estimate the occurrence cost of the new morpheme.

The information processing device 200 shown in FIG. 9 has been described as a configuration in which the "occurrence cost" of a new morpheme is estimated from the notation feature amount and the part-of-speech feature amount of the new morpheme using the occurrence cost regression model 130. For example, two types of costs of the "occurrence cost" and the "concatenation cost" of the new morpheme may be estimated from the notation feature amount and the part-of-speech feature amount of the new morpheme using the occurrence cost regression model 130.

The occurrence cost regression model 130 used in this configuration is a learning model that receives the notation feature amount and the part-of-speech feature amount of the morpheme to estimate two types of costs of the "occurrence cost" and the "concatenation cost" of the morpheme.

6. Information Processing Device that Executes Morphological Analysis Process Using Dictionary in which Occurrence Cost of New Morpheme is Registered Next, an information processing device that executes a morphological analysis process using a dictionary in which the occurrence cost of a new morpheme is registered will be described.

Figure 11:
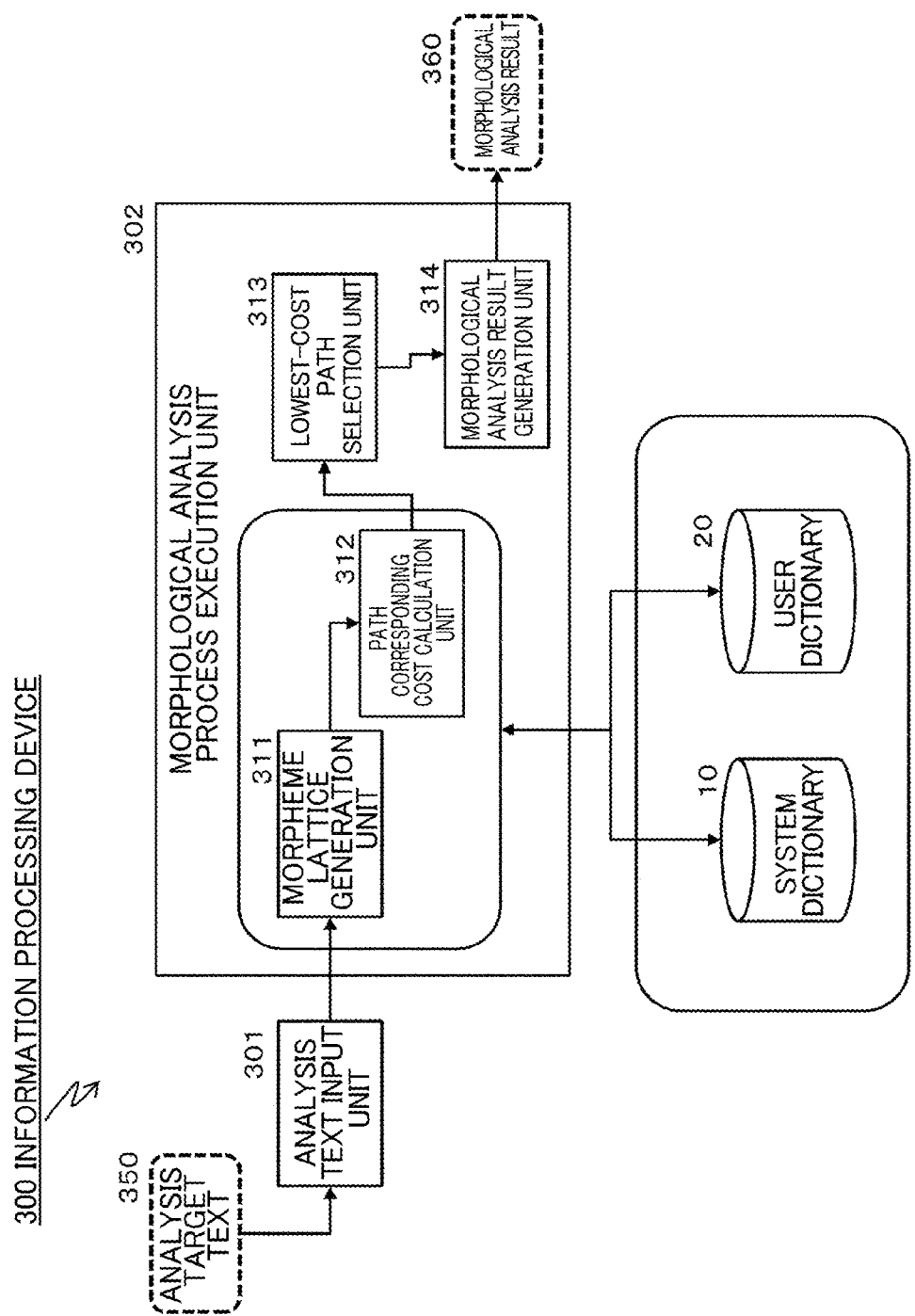
FIG. 11 is a diagram illustrating a configuration example of the information processing device of the present disclosure.

FIG. 11 is a block diagram showing a configuration example of an information processing device 300 that executes a morphological analysis process using a dictionary in which the occurrence cost of a new morpheme is registered.

As shown in FIG. 11, the information processing device 300 has an analysis text input unit 301 and a morphological analysis process execution unit 302.

The morphological analysis process execution unit 302 includes a morpheme lattice generation unit 311, a path corresponding cost calculation unit 312, a lowest-cost path selection unit 313, and a morphological analysis result generation unit 314.

The analysis text input unit 301 inputs text data to be processed for morphological analysis.

The text data input by the analysis text input unit 301 is input to the morpheme lattice generation unit 311 of the morphological analysis process execution unit 302.

The morpheme lattice generation unit 311 generates a morpheme lattice on the basis of the input text.

The morpheme lattice is a diagram in which analysis target text is divided into morpheme units and the possible connections of the characters in these morpheme units are concatenated as described with reference to FIG. 1 and the like.

The morphemes that make up this morpheme lattice are the morphemes registered in the dictionary. The information processing device 300 shown in FIG. 11 generates a morpheme lattice using two dictionaries of the system dictionary 10 and the user dictionary 20.

In the user dictionary 20, the occurrence cost estimated by the information processing device 200 described with reference to FIG. 9 by the occurrence cost estimation process using the occurrence cost regression model 130 is registered.

The morpheme lattice generation unit 311 acquires the morphemes from the system dictionary 10 and the morphemes not registered in the system dictionary 10 from the user dictionary 20, and further acquires the occurrence cost corresponding to the morphemes from these two dictionaries to generate the morpheme lattice.

The path corresponding cost calculation unit 312 calculates the cost of each path of the morpheme lattice.

The occurrence cost and the concatenation cost necessary for calculating the path cost are acquired from the system dictionary 10 and the user dictionary 20.

The lowest-cost path selection unit 313 selects the path having the lowest cost from the costs of each path of the morpheme lattice calculated by the path corresponding cost calculation unit 312.

Finally, the morphological analysis result generation unit 314 extracts the morphemes constituting the lowest-cost path selected by the lowest-cost path selection unit 313, and further acquires the part-of-speech information and the like of the extracted morphemes from the system dictionary 10 and the user dictionary 20 to generate and output a morphological analysis result 360.

The system dictionary 10 and the user dictionary 20 may be the components of the information processing device 300, or may be set as dictionaries of devices such as external servers connected to the Internet, and the information processing device 300 may access and use them.

7. Configuration Example of Information Processing Device that Generates and Uses Occurrence Cost Regression Model and Executes Morphological Analysis Process Next, a configuration example of an information processing device that generates and uses an occurrence cost regression model and executes a morphological analysis process will be described.

With reference to FIGS. 7, 9, and 11, the configurations and processes of the following three types of information processing devices have been described.

(1) FIG. 7=Information processing device 100 that generates an occurrence cost regression model (2) FIG. 9=Information processing device 200 that estimates the occurrence cost of a new morpheme using the occurrence cost regression model (3) FIG. 11=Information processing device 300 that executes morphological analysis These three types of information processing devices can also be configured as one information processing device.

Figure 12:
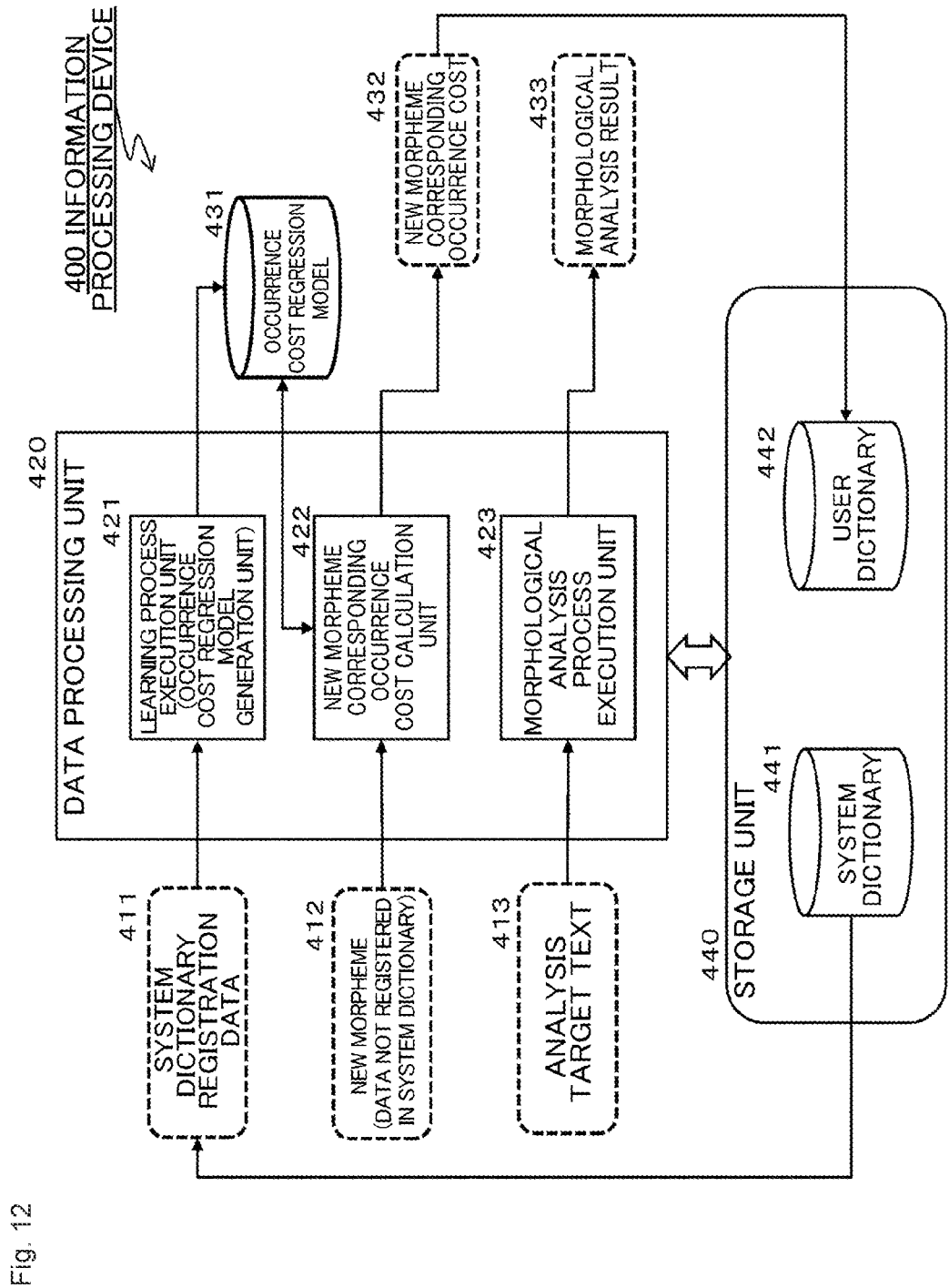
FIG. 12 is a diagram illustrating a configuration example of the information processing device of the present disclosure.

FIG. 12 is a block diagram showing a configuration example of an information processing device 400 when the above three types of information processing devices are configured as one information processing device.

The information processing device 400 has a data processing unit 420.

The data processing unit 420 includes a learning process execution unit (occurrence cost regression model generation unit) 421, a new morpheme corresponding occurrence cost calculation unit 422, and a morphological analysis process execution unit 423.

The learning process execution unit (occurrence cost regression model generation unit) 421 executes the process described with reference to FIG. 7, that is, the process of receiving the system dictionary registration data 411 registered in a system dictionary 441 of a storage unit 440 and executing a learning process to generate the occurrence cost regression model 130.

The new morpheme corresponding occurrence cost calculation unit 422 executes the process described with reference to FIG. 9, that is, the process of receiving a new morpheme (data not registered in the system dictionary) 412 which is an unknown word and estimating the occurrence cost of the new morpheme 412 using the occurrence cost regression model 130.

The generated new morpheme corresponding occurrence cost 432 is registered in the user dictionary 442 of the storage unit 440.

The morphological analysis process execution unit 423 executes the process described with reference to FIG. 11, that is, the process of receiving the analysis target text 413 to generate a morpheme lattice, calculate the path corresponding cost, and select the lowest-cost path using the registration data of the system dictionary 441 and the user dictionary 412. The morphological analysis process execution unit 423 extracts the morphemes constituting the lowest-cost path and outputs the morphemes as the morphological analysis result 433 together with the part-of-speech information.

The processes executed by the learning process execution unit (occurrence cost regression model generation unit) 421, the new morpheme corresponding occurrence cost calculation unit 422, and the morphological analysis process execution unit 423 can be executed according to the program stored in the storage unit of the information processing device 400. For example, the processes can be executed as program execution processing by a processor such as a CPU having a program execution function.

The system dictionary 441 and the user dictionary 442 of the storage unit 440 may be components of the information processing device 400, or may be set as dictionaries of a device such as an external server connected to the Internet, and the information processing device 400 may access and use them.

8. Hardware Configuration Example of Information Processing Device

Next, a hardware configuration example of the information processing device will be described with reference to FIG. 13.

The hardware described with reference to FIG. 13 is a hardware configuration example of the information processing devices described with reference to FIGS. 7, 9, 11, and 12.

A CPU (Central Processing Unit) 501 functions as a control unit or a data processing unit that executes various processes according to a program stored in a ROM (Read Only Memory) 502 or a storage unit 508. For example, the process according to the sequence described in the above-described embodiment is executed. A RAM (Random Access Memory) 503 stores programs and data executed by the CPU 501. The CPU 501, the ROM 502, and the RAM 503 are connected to each other by a bus 504.

The CPU 501 is connected to an input/output interface 505 via the bus 504, and the input/output interface 505 is connected to an input unit 506 including various switches, a keyboard, a mouse, a microphone, a sensor, and the like, and an output unit 507 including a display, a speaker, and the like. The CPU 501 executes various processes in response to a command input from the input unit 506, and outputs the processing results to, for example, the output unit 507.

The storage unit 508 connected to the input/output interface 505 is formed of, for example, a hard disk or the like, and stores a program executed by the CPU 501 and various pieces of data. A communication unit 509 functions as a transmission and reception unit for Wi-Fi communication, Bluetooth (registered trademark) (BT) communication, and other data communication via a network such as the Internet or a local area network, and communicates with an external device.

A drive 510 connected to the input/output interface 505 drives a removable medium 511 such as a magnetic disk, an optical disc, a magneto-optical disc, or a semiconductor memory such as a memory card, and records or reads data.

9. Summary of Structure of Present Disclosure

As described above, the embodiments of the present disclosure have been described in detail with reference to the specific embodiments. However, it is obvious to those skilled in the art that the embodiments can be modified or substituted without departing from the gist of the present disclosure. That is, the present invention has been disclosed in the form of an example, and should not be taken as definitive. The gist of present disclosure should be understood from the appended The technology disclosed in the present specification can have the following configuration.

(1) An information processing device including: a notation feature amount extraction unit that extracts a notation feature amount of a character string; a part-of-speech feature amount extraction unit that extracts a part-of-speech feature amount of the character string; and an occurrence cost estimation unit that receives the notation feature amount and the part-of-speech feature amount of the character string and calculates an occurrence cost of the character string by applying an occurrence cost regression model, wherein the occurrence cost is data used in a morphological analysis process, and the occurrence cost regression model is a learning model that estimates the occurrence cost from the notation feature amount and the part-of-speech feature amount of a character string, generated by a learning process using registration data of an existing morphological analysis dictionary as teacher data.

(2) The information processing device according to (1), wherein the character string of which the occurrence cost is to be calculated by the occurrence cost estimation unit is a character string constituting a new morpheme that is not registered in the existing morphological analysis dictionary.

(3) The information processing device according to (2), wherein the occurrence cost estimation unit registers the calculated occurrence cost as an occurrence cost corresponding to the new morpheme in a morphological analysis dictionary.

(4) The information processing device according to any one of (1) to (3), wherein the notation feature amount extraction unit extracts types of characters constituting the character string as the notation feature amount.

(5) The information processing device according to any one of (1) to (4), wherein the part-of-speech feature amount extraction unit extracts a part-of-speech type of the character string and a feature amount obtained from a notation thereof as the part-of-speech feature amount.

(6) The information processing device according to any one of (1) to (5), wherein the occurrence cost estimation unit receives a notation feature amount including the types of characters constituting the character string and a part-of-speech feature amount including the part-of-speech type of the character string, and calculates the occurrence cost of the character string by applying the occurrence cost regression model.

(7) The information processing device according to any one of (1) to (6), wherein the notation feature amount of the character string extracted by the notation feature amount extraction unit is a notation feature amount including at least one of a type and a composition of characters constituting the character string, a character string length, and words used in the character string.

(8) The information processing device according to any one of (1) to (7), further including a machine learning process execution unit that generates the occurrence cost regression model, wherein the machine learning process execution unit receives a notation feature amount, a part-of-speech feature amount, and an occurrence cost of morphemes registered in an existing morphological analysis dictionary as input data and executes a learning process using the input data as teacher data to generate the occurrence cost regression model.

(9) The information processing device according to (8), wherein the machine learning process execution unit generates an occurrence cost regression model which is a learning model that receives a notation feature amount including types of characters constituting a character string and a part-of-speech feature amount including a part of speech type of the character string and a notation thereof and outputs an occurrence cost.

(10) An information processing device including: an analysis text input unit that inputs text; and a morphological analysis process execution unit that executes a morphological analysis process on the text, wherein the morphological analysis process execution unit executes a morphological analysis process by applying a morphological analysis dictionary in which an occurrence cost of a morpheme unit is registered, and the morphological analysis dictionary used by the morphological analysis process execution unit is a dictionary in which additional registration is performed using an occurrence cost estimated by applying an occurrence cost regression model generated by a learning process which uses registration data of an existing morphological analysis dictionary as teacher data.

(11) The information processing device according to (10), wherein the morphological analysis process execution unit includes: a morpheme lattice generation unit that generates a morpheme lattice; a path corresponding cost calculation unit that calculates a path corresponding cost of the morpheme lattice; and a lowest-cost path selection unit that selects a lowest-cost path from paths of the morpheme lattice.

(12) The information processing device according to (10) or (11), wherein the occurrence cost regression model is a learning model for estimating an occurrence cost from a notation feature amount and a part-of-speech feature amount of a character string.

(13) The information processing device according to (12), wherein the notation feature amount includes character type information of characters constituting the character string, and the part-of-speech feature amount includes part-of-speech type information of the character string.

(14) An information processing method executed in an information processing device, including: allowing a notation feature amount extraction unit to extract a notation feature amount of a character string; allowing a part-of-speech feature amount extraction unit to extract a part-of-speech feature amount of the character string; and allowing an occurrence cost estimation unit to receive the notation feature amount and the part-of-speech feature amount of the character string and calculate an occurrence cost of the character string by applying an occurrence cost regression model, wherein the occurrence cost calculated by the occurrence cost estimation unit is data used in a morphological analysis process, and the occurrence cost regression model applied by the occurrence cost estimation unit is a learning model that estimates the occurrence cost from the notation feature amount and the part-of-speech feature amount of a character string, generated by a learning process using registration data of an existing morphological analysis dictionary as teacher data.

(15) An information processing method executed in an information processing device, including: allowing an analysis text input unit to input analysis target text; and allowing a morphological analysis process execution to execute a morphological analysis process on the input text by applying a morphological analysis dictionary in which an occurrence cost of a morpheme unit is registered, wherein the morphological analysis dictionary applied by the morphological analysis process execution unit is a dictionary in which an occurrence cost estimated by applying an occurrence cost regression model which is a learning model generated by a learning process which uses registration data of an existing morphological analysis dictionary as teacher data is registered.

(16) A program for causing an information processing device to execute information processing, including: allowing a notation feature amount extraction unit to extract a notation feature amount of a character string; allowing a part-of-speech feature amount extraction unit to extract a part-of-speech feature amount of the character string; and allowing an occurrence cost estimation unit to receive the notation feature amount and the part-of-speech feature amount of the character string and calculate an occurrence cost of the character string by applying an occurrence cost regression model, wherein the occurrence cost calculated by the occurrence cost estimation unit is data used in a morphological analysis process, and the occurrence cost regression model applied by the occurrence cost estimation unit is a learning model that estimates the occurrence cost from the notation feature amount and the part-of-speech feature amount of a character string, generated by a learning process using registration data of an existing morphological analysis dictionary as teacher data.

(17) A program for causing an information processing device to execute information processing, including: allowing an analysis text input unit to input analysis target text; and allowing a morphological analysis process execution to execute a morphological analysis process on the input text by applying a morphological analysis dictionary in which an occurrence cost of a morpheme unit is registered, wherein the morphological analysis dictionary applied by the morphological analysis process execution unit is a dictionary in which an occurrence cost estimated by applying an occurrence cost regression model which is a learning model generated by a learning process which uses registration data of an existing morphological analysis dictionary as teacher data is registered.

The series of processing described in the specification can be executed by hardware, software, or a composite configuration of both. When the processes are performed by software, a program including the process sequence can be installed in and executed by a memory of a computer assembled into exclusive hardware. Alternatively, the program can be installed in and executed by a general-purpose computer performing various processes. For example, the program can be recorded in advance on a recording medium. The program cannot only be installed in a computer from a recording medium but may be also received through a network such as a LAN (Local Area Network) and the Internet and installed in a recording medium such as a built-in hard disk.

The various processes described in this specification can be performed consecutively in the described order or may be performed in parallel or individually depending on the processing capability of the device performing the processes or as needed. In the present specification, the system is a logical set of configurations of a plurality of devices, and the devices having each configuration are not limited to those in the same housing.

INDUSTRIAL APPLICABILITY

As described above, according to the configuration of one embodiment of the present disclosure, a configuration is realized in which the occurrence cost of an unknown word that is not registered in the morphological analysis dictionary is calculated by applying the occurrence cost regression model, which is a learning model. Specifically, for example, the information processing device includes a notation feature amount extraction unit that extracts a notation feature amount of a character string, a part-of-speech feature amount extraction unit that extracts a part-of-speech feature amount of the character string, and an occurrence cost estimation unit that receives the notation feature amount and the part-of-speech feature amount and calculates an occurrence cost of the character string by applying an occurrence cost regression model. The occurrence cost regression model is a learning model that estimates the occurrence cost from the notation feature amount and the part-of-speech feature amount of a character string, generated by a learning process using registration data of an existing morphological analysis dictionary as teacher data.

With this configuration, a configuration is realized in which the occurrence cost of an unknown word that is not registered in a morphological analysis dictionary is calculated by applying the occurrence cost regression model, which is a learning model.

REFERENCE SIGNS LIST

10 System dictionary
20 User dictionary
100 Information processing device
101 Notation feature amount extraction unit
102 Part-of-speech feature amount extraction unit
103 Occurrence cost extraction unit
121 Machine learning process execution unit (occurrence cost regression model generation unit)
130 Occurrence cost regression model
200 Information processing device
201 Notation feature amount extraction unit
202 Part-of-speech feature amount extraction unit
220 Occurrence cost estimation unit
300 Information processing device
301 Analysis text input unit
302 Morphological analysis process execution unit
311 Morpheme lattice generation unit
312 Path corresponding cost calculation unit
313 Lowest-cost path selection unit
314 Morphological analysis result generation unit
400 Information processing device
420 Data processing unit
421 Learning process execution unit (occurrence cost regression model generation unit)
422 New morpheme corresponding occurrence cost calculation unit
423 Morphological analysis process execution unit
431 Occurrence cost regression model
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An information processing device comprising:
a notation feature amount extraction unit that extracts a notation feature amount of a character string;
a part-of-speech feature amount extraction unit that extracts a part-of-speech feature amount of the character string; and
an occurrence cost estimation unit that receives the notation feature amount and the part-of-speech feature amount of the character string and calculates an occurrence cost of the character string by applying an occurrence cost regression model, wherein the occurrence cost is data used in a morphological analysis process, and
the occurrence cost regression model is a learning model that estimates the occurrence cost from the notation feature amount and the part-of-speech feature amount of the character string, generated by a learning process using registration data of an existing morphological analysis dictionary as teacher data.

2. The information processing device according to claim 1, wherein
the character string of which the occurrence cost is to be calculated by the occurrence cost estimation unit is a character string constituting a new morpheme that is not registered in the existing morphological analysis dictionary.

3. The information processing device according to claim 2, wherein
the occurrence cost estimation unit registers the calculated occurrence cost as an occurrence cost corresponding to the new morpheme in a morphological analysis dictionary.

4. The information processing device according to claim 1, wherein
the notation feature amount extraction unit extracts types of characters constituting the character string as the notation feature amount.

5. The information processing device according to claim 1, wherein
the part-of-speech feature amount extraction unit extracts a part-of-speech type of the character string and a feature amount obtained from a notation thereof as the part-of-speech feature amount.

6. The information processing device according to claim 1, wherein
the occurrence cost estimation unit receives a notation feature amount including the types of characters constituting the character string and a part-of-speech feature amount including the part-of-speech type of the character string, and calculates the occurrence cost of the character string by applying the occurrence cost regression model.

7. The information processing device according to claim 1, wherein
the notation feature amount of the character string extracted by the notation feature amount extraction unit is a notation feature amount including at least one of a type and a composition of characters constituting the character string, a character string length, and words used in the character string.

8. The information processing device according to claim 1, further comprising a machine learning process execution unit that generates the occurrence cost regression model, wherein
the machine learning process execution unit receives a notation feature amount, a part-of-speech feature amount, and an occurrence cost of morphemes registered in an existing morphological analysis dictionary as input data and executes a learning process using the input data as teacher data to generate the occurrence cost regression model.

9. The information processing device according to claim 8, wherein
the machine learning process execution unit generates an occurrence cost regression model which is a learning model that receives a notation feature amount including types of characters constituting a character string and a part-of-speech feature amount including a part of speech type of the character string and a notation thereof and outputs an occurrence cost.

10. An information processing device comprising:
an analysis text input unit that inputs text; and
a morphological analysis process execution unit that executes a morphological analysis process on the text, wherein
the morphological analysis process execution unit executes a morphological analysis process by applying a morphological analysis dictionary in which an occurrence cost of a morpheme unit is registered, and
the morphological analysis dictionary used by the morphological analysis process execution unit is a dictionary in which additional registration is performed using an occurrence cost estimated by applying an occurrence cost regression model generated by a learning process which uses registration data of an existing morphological analysis dictionary as teacher data.

11. The information processing device according to claim 10, wherein
the morphological analysis process execution unit includes:
a morpheme lattice generation unit that generates a morpheme lattice;
a path corresponding cost calculation unit that calculates a path corresponding cost of the morpheme lattice; and
a lowest-cost path selection unit that selects a lowest-cost path from paths of the morpheme lattice.

12. The information processing device according to claim 10, wherein
the occurrence cost regression model is a learning model for estimating an occurrence cost from a notation feature amount and a part-of-speech feature amount of a character string.

13. The information processing device according to claim 12, wherein
the notation feature amount includes character type information of characters constituting the character string, and the part-of-speech feature amount includes part-of-speech type information of the character string.

14. An information processing method executed in an information processing device, comprising:
allowing a notation feature amount extraction unit to extract a notation feature amount of a character string;
allowing a part-of-speech feature amount extraction unit to extract a part-of-speech feature amount of the character string; and
allowing an occurrence cost estimation unit to receive the notation feature amount and the part-of-speech feature amount of the character string and calculate an occurrence cost of the character string by applying an occurrence cost regression model, wherein
the occurrence cost calculated by the occurrence cost estimation unit is data used in a morphological analysis process, and
the occurrence cost regression model applied by the occurrence cost estimation unit is a learning model that estimates the occurrence cost from the notation feature amount and the part-of-speech feature amount of the character string, generated by a learning process using registration data of an existing morphological analysis dictionary as teacher data.

15. An information processing method executed in an information processing device, comprising:
allowing an analysis text input unit to input analysis target text; and
allowing a morphological analysis process execution unit to execute a morphological analysis process on the input text by applying a morphological analysis dictionary in which an occurrence cost of a morpheme unit is registered, wherein
the morphological analysis dictionary applied by the morphological analysis process execution unit is a dictionary in which an occurrence cost estimated by applying an occurrence cost regression model which is a learning model generated by a learning process which uses registration data of an existing morphological analysis dictionary as teacher data is registered.

16. A non-transitory computer-readable storage medium storing a program for causing an information processing device to execute information processing, comprising:
allowing a notation feature amount extraction unit to extract a notation feature amount of a character string;
allowing a part-of-speech feature amount extraction unit to extract a part-of-speech feature amount of the character string; and
allowing an occurrence cost estimation unit to receive the notation feature amount and the part-of-speech feature amount of the character string and calculate an occurrence cost of the character string by applying an occurrence cost regression model, wherein
the occurrence cost calculated by the occurrence cost estimation unit is data used in a morphological analysis process, and
the occurrence cost regression model applied by the occurrence cost estimation unit is a learning model that estimates the occurrence cost from the notation feature amount and the part-of-speech feature amount of the character string, generated by a learning process using registration data of an existing morphological analysis dictionary as teacher data.

17. A non-transitory computer-readable storage medium storing a program for causing an information processing device to execute information processing, comprising:

allowing an analysis text input unit to input analysis target text; and allowing a morphological analysis process execution unit to execute a morphological analysis process on the input text by applying a morphological analysis dictionary in which an occurrence cost of a morpheme unit is registered, wherein the morphological analysis dictionary applied by the morphological analysis process execution unit is a dictionary in which an occurrence cost estimated by applying an occurrence cost regression model which is a learning model generated by a learning process which uses registration data of an existing morphological analysis dictionary as teacher data is registered.

\* \* \* \* \*